US010205961B2

United States Patent
Chen et al.

(10) Patent No.: US 10,205,961 B2
(45) Date of Patent: Feb. 12, 2019

(54) VIEW DEPENDENCY IN MULTI-VIEW CODING AND 3D CODING

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 847 days.

(21) Appl. No.: 13/867,924

(22) Filed: Apr. 22, 2013

(65) Prior Publication Data

US 2013/0279576 A1 Oct. 24, 2013

Related U.S. Application Data

(60) Provisional application No. 61/637,197, filed on Apr. 23, 2012.

(51) Int. Cl.
*H04N 19/52* (2014.01)
*H04N 19/597* (2014.01)
(Continued)

(52) U.S. Cl.
CPC ............. *H04N 19/52* (2014.11); *H04N 19/30* (2014.11); *H04N 19/51* (2014.11);
(Continued)

(58) Field of Classification Search
CPC .............................................. H04N 19/00684
(Continued)

(56) References Cited

U.S. PATENT DOCUMENTS

| 5,612,735 A * | 3/1997 | Haskell ............. H04N 13/0048 348/43 |
| 7,535,383 B2 * | 5/2009 | Segall ................. H04N 19/176 341/50 |

(Continued)

FOREIGN PATENT DOCUMENTS

| CN | 101248670 A | 8/2008 |
| CN | 101292538 A | 10/2008 |

(Continued)

OTHER PUBLICATIONS

Schwarz, H., Marpe, D., and Thomas, W. "Overview of the Scalable Video Coding Extension of the H.264/AVC standard." IEEE Transactions on Circuits and systems for Video Technology. vol. 17. No. 9 (Sep. 2007) p. 1103-1120.*

(Continued)

*Primary Examiner* — Dave Czekaj
*Assistant Examiner* — Shanika M Brumfield
(74) *Attorney, Agent, or Firm* — Shumaker & Sieffert, P.A.

(57) ABSTRACT

This disclosure described techniques for coding layer dependencies for a block of video data. According to these techniques, a video encoder generates layer dependencies associated with a given layer. The video encoder also generates a type of prediction associated with one or more of the layer dependencies. In some examples, the video encoder generates a first syntax element to signal layer dependencies and a second syntax element to signal a type of prediction associated with one or more of the layer dependencies. A video decoder may obtain the layer dependencies associated with a given layer and the type of prediction associated with one or more of the layer dependencies.

15 Claims, 9 Drawing Sheets

(51) Int. Cl.
*H04N 19/70* (2014.01)
*H04N 19/30* (2014.01)
*H04N 19/51* (2014.01)
*H04N 19/105* (2014.01)

(52) U.S. Cl.
CPC .......... *H04N 19/597* (2014.11); *H04N 19/70* (2014.11); *H04N 19/105* (2014.11)

(58) Field of Classification Search
USPC .......................................... 375/24.02–240.2
See application file for complete search history.

(56) References Cited

U.S. PATENT DOCUMENTS

| | | | |
|---|---|---|---|
| 8,363,732 | B2 | 1/2013 | Jeon et al. |
| 8,391,356 | B1* | 3/2013 | Jafari ............... H04L 47/2433 375/240.01 |
| 8,611,412 | B2 | 12/2013 | Ying et al. |
| 8,929,462 | B2* | 1/2015 | Wang ................ H04N 19/142 375/240.24 |
| 2006/0133482 | A1* | 6/2006 | Park ................... H04N 19/63 375/240.08 |
| 2007/0064000 | A1 | 3/2007 | Engel |
| 2007/0064800 | A1 | 3/2007 | Ha |
| 2008/0007438 | A1* | 1/2008 | Segall ............... H04N 19/176 341/61 |
| 2008/0089411 | A1* | 4/2008 | Wenger ............. H04N 19/105 375/240.12 |
| 2008/0095235 | A1* | 4/2008 | Hsiang ............... H04N 19/63 375/240.13 |
| 2010/0027654 | A1 | 2/2010 | Jeon et al. |
| 2010/0165077 | A1 | 7/2010 | Yin et al. |
| 2011/0103485 | A1* | 5/2011 | Sato .................. H04N 19/105 375/240.16 |
| 2012/0013746 | A1* | 1/2012 | Chen ................... G11B 27/034 348/180 |
| 2012/0044322 | A1* | 2/2012 | Tian ................... H04N 19/597 348/43 |
| 2012/0056981 | A1 | 3/2012 | Tian et al. |
| 2012/0075436 | A1* | 3/2012 | Chen ................... H04N 19/597 348/51 |
| 2012/0229602 | A1 | 9/2012 | Chen et al. |
| 2012/0269275 | A1* | 10/2012 | Hannuksela ....... H04N 13/0048 375/240.25 |
| 2012/0314027 | A1 | 12/2012 | Tian et al. |
| 2013/0022113 | A1 | 1/2013 | Chen et al. |
| 2013/0114670 | A1 | 5/2013 | Chen et al. |
| 2013/0114705 | A1 | 5/2013 | Chen et al. |
| 2013/0155184 | A1* | 6/2013 | Chen .................. H04N 13/0048 348/43 |
| 2013/0163670 | A1* | 6/2013 | Cherif ................ H04N 19/597 375/240.16 |
| 2013/0195169 | A1* | 8/2013 | Jang ................. H04N 19/00424 375/240.02 |

FOREIGN PATENT DOCUMENTS

| | | | |
|---|---|---|---|
| CN | 101356822 A | 1/2009 | |
| JP | 2009513074 A | 3/2009 | |
| JP | 2011501497 A | 1/2011 | |
| WO | 2007047736 A2 | 4/2007 | |
| WO | 2007126508 A2 | 11/2007 | |
| WO | 2008047258 A2 | 4/2008 | |
| WO | 2008088497 A2 | 7/2008 | |
| WO | WO 2009005302 A1 * | 1/2009 | ......... H04N 21/4345 |
| WO | 2009050658 A2 | 4/2009 | |
| WO | 2010126608 A2 | 11/2010 | |
| WO | 2010126613 A2 | 11/2010 | |

OTHER PUBLICATIONS

Boyce, et al., "JCT-VC break-out report: Reference picture buffering and list construction (AHG21)," Document: JCTVC-G1002, Joint Collaborative Team on Video Coding (JCT-VC) of ITU-T SG16 WP3 and ISO/IEC JTC1/SC29/ WG11, 7th Meeting: Geneva, CH, Nov. 21-30, 2011, 21 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen, et al., "AHG12: Video parameter set and its use in 3D-HEVC", JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I0571, XP030112334, 9 pp.

Chen, et al., "Single-Loop Decoding for Multiview Video Coding," IEEE, Department of Signal Processing, 2008, pp. 605-608.

Hannuksela, et al., "3DV-ATM HP/EHP high-level syntax: sequence parameter set design", MPEG Meeting; May 2012; Geneva; (Motion Picture Expert Group or ISO/IEC JTC1/SC29/WG11), No. m24892, XP030053235, 7 pp.

International Preliminary Report on Patentability—PCT/US2013/037760, The International Bureau of WIPO—Geneva, Switzerland, Jul. 31, 2014, 9 pp.

International Search Report and Written Opinion—PCT/US2013/037760—ISA/EPO—dated Aug. 5, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H:Audiovisual and Multimedia Systems, Infrastructure of audiovisual services—Coding of moving video, High efficiency video coding, The International Telecommunication Union, Apr. 2013, 317 pp.

Jeon et al., "Comments on JMVM 8.0", JVT Meeting; MPEG Meeting; Jul. 20, 2008-Jul. 25, 2008; Hannover,; (Joint Video Team of ISO/IEC JTC1/SC29/WG11 and ITU-T SG.16 ), No. JVT-AB030, XP030007416, 21 pp.

Jeon, et al., "High level syntax for motion skip mode", JVT Meeting; Apr. 6, 2008-Apr. 10, 2008; Geneva, ; (Joint Video Team of ISO/IEC JTC1/SC29/WG11 and ITU-T SG.16 ), No. JVT-AA031, XP030007374, 11 pp.

Song, et al., "Comments on view dependency info", JVT Meeting; MPEG Meeting; Apr. 21, 2007-Apr. 27, 2007; San Josa CR ,US; (Joint Video Team of ISO/IEC JTC1/SC29/WG11 and ITU-T SG. 16 ), No. JVT-W074, XP030007034, 11 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011, 193 pp.

Response to Written Opinion dated Aug. 5, 2013, from International Application No. PCT/US2013/037760, filed on Feb. 21, 2014, 30 pp.

Second Written Opinion from International Application No. PCT/US2013/037760, dated Apr. 24, 2014, 8 pp.

Response to Written Opinion dated Apr. 24, 2014, from International Application No. PCT/US2013/037760, filed on Jun. 24, 2014, 26 pp.

Chen et al., "SHVC Draft Text 1," Joint Collaborative Team on Video Coding (JCTVC) of ITU-T SG16 WP3 and ISO/IEC JTC1/SC29/WG11, Document: JCTVC-L1008, 12th Meeting, Geneva, Switzerland, Jan. 14-23, 2013, 34 pp.

Ohm, et al., "Work Plan in 3D Standards Development," Document: JCT3V-B1006, Joint Collaborative Team on 3D Video coding Extension Development of ITU-T SG 16 WP 3 and ISO/IEC JTC 1/SC 29/WG 11, 2nd Meeting: Shanghai, CN, Oct. 13-19, 2012, 5 pp.

ITU-T H.264, Series H: Audiovisual and Multimedia Systems, Infrastructure of audiovisual services—Coding of moving video, Advacned video coding for generic audiovisual services, Mar. 2005, 343 pages.

ITU-T H.264, Series H: Audiovisual and Multimedia Systems, Infrastructure of audiovisual services—Coding of moving video, Advanced video coding for generic audiovisual services, Mar. 2010, 674 pp.

Pandit et al., "H.264/AVC extension for MVC using SEI message", Joint Video Team (JVT) of ISO/IEC MPEG & ITU-T VCEG (ISO/IEC JTC1/SC29/WG11 and ITU-T SG16 Q6), No. JVT-X061, Jun. 29, 2007, XP002506970, 14 pp.

Pandit et al., "MVC Single-Loop Decoding," Joint Video Team (JVT) of ISO/IEC MPEG & ITU-T VCEG (ISO/IEC JTC1/SC29/WG11 and ITU-T SG16 Q.6), Doc: JVT-Y042, Shenzhen, China, Oct. 20-26, 2007, 7 pp.

Tech et al., "MV-HEVC Draft Text 3 (ISO/IEC 23008-2:201x/PDAM2)," Joint Collaborative Team on Video Coding (JCT-VC) of ITU-T SG16 WP3 and ISO/IEC JTC1/SC29/WG11, 12th Meeting, Geneva, Switzerland, Jan. 2013, 34 pp.

ISO/IEC, "Information technology—Coding of audio-visual objects—Part 15: Advanced Video Coding (AVC) file format," International Standard ISO/IEC 14496-15 Second edition, ISO, Jun. 1, 2010, pp. 77-78.

Hannuksela, et al., MV-HEVC/SHVC HLS: On inter-layer sample and syntax prediction indications (combining aspects of JCTVC-M0205 and JCTVC-M0046); Joint Collaborative Team on 3D Video Coding Extensions of ITU-T SG 16 WP 3 and ISO/IEC JTC 1/SC 29/WG 11, Apr. 18-26, 2013; document No. JCTVC-M0457; Apr. 23, 2013, 8 pp.

Hannuksela, et al., MV-HEVC/SHVC HLS: On inter-layer sample and syntax prediction indications (combining aspects of JCTVC-M0205 and JCTVC-M0046); Joint Collaborative Team on 3D Video Coding Extensions of ITU-T SG 16 WP 3 and ISO/IEC JTC 1/SC 29/WG 11, Apr. 18-26, 2013; document No. JCTVC-M0457_v2; Apr. 25, 2013, 8 pp.

Jung, et al., "3D-CE3.h-related: Comments on contribution JCT3V-D0121 on early depth CU decision," Joint Collaborative Team on 3D Video Coding Extensions of ITU-T SG 16 WP 3 and ISO/IEC JTC 1/SC 29/WG 11 , Apr. 20-26, 2013; document No. JCT3V-D0303, Apr. 19, 2013, 2 pp.

Chen, et al., "Single-loop decoding and motion skip study in JMVM," JVT-Y053, Shenzhen, China, Oct. 21-26, 2007, 12 pp.

* cited by examiner

VIEW DEPENDENCY IN MULTI-VIEW CODING AND 3D CODING

This application claims the benefit of:
U.S. Provisional Patent Application No. 61/637,197, filed 23 Apr. 2012, the entire content of which is hereby incorporated by reference.

TECHNICAL FIELD

This disclosure relates to video coding and, more particularly, to view dependencies used in video data prediction.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), the High Efficiency Video Coding (HEVC) standard presently under development, and extensions of such standards, to transmit and receive digital video information more efficiently.

Video compression techniques perform spatial prediction (intra-picture) and/or temporal prediction to reduce or remove redundancy inherent in video sequences. For block-based video coding, a video frame or slice (i.e., a picture or a portion of a picture) may be partitioned into video blocks, which may be referred to as treeblocks, coding units (CUs) and/or coding nodes. Each block can be further partitioned. Video blocks in an intra-coded (I) frame or slice of a picture are encoded using spatial prediction with respect to reference samples in neighboring blocks in the same picture. Video blocks in an inter-coded (P or B) frame or slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two dimensional array, may be scanned in order to produce a one-dimensional vector of transform coefficients, and entropy coding may be applied to achieve even more compression.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010, the entire content of which is incorporated by reference.

In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). Furthermore, there are ongoing efforts to produce scalable video coding, multi-view video coding, and 3DV extensions for HEVC. The multi-view extension to HEVC, namely MV-HEVC, is being developed by the JCT-3V. Tech et al., "MV-HEVC Draft Text 3 (ISO/IEC 23008-2:201x/PDAM2)," Joint Collaborative Team on Video Coding (JCT-VC) of ITU-T SG16 WP3 and ISO/IEC JTC1/SC29/WG11, $12^{th}$ Meeting, Geneva, Switzerland, January 2013, (hereinafter referred to as MV-HEVC WD 3), which as of Apr. 22, 2013, is available from http://phenix.it-sudparis.eu/jct2/doc_end_user/documents/3_Geneva/wg11/JCT3V-C1004-v4.zip, the entire content of which is incorporated herein by reference. The scalable extension to HEVC, named SHVC, is also being developed by the JCT-VC. Chen et al., "SHVC Draft Text 1," Joint Collaborative Team on Video Coding (JCT-VC) of ITU-T SG16 WP3 and ISO/IEC JTC1/SC29/WG11, $12^{th}$ Meeting, Geneva, Switzerland, January 2013, (hereinafter referred to as SHVC WD1), which as of Apr. 22, 2013, is available from http://phenix.int-evey.fr/jct/doc_end_user/documents/12_Geneva/wg11/JCTVC-L1008-v1. zip, the entire content of which is incorporated herein by reference. A recent specification draft of HEVC, HEVC text specification draft 10 and referred to as HEVC hereinafter, which is incorporated herein by reference and is available, as of Apr. 22, 2013 from: http://phenix.it-sudparis.eu/jct/doc_end_user/documents/12_Geneva/wg11/JCTVC-L1003-v34.zip.

SUMMARY

In general, this disclosure describes techniques for coding video data including multiple layers. More particularly, this disclosure describes techniques for performing scalable video coding, multi-view video coding, and three-dimensional video coding (3DVC). Scalable video coding may generally define a video coding technology for coding multiple layers. Multi-view video coding may generally define a video coding technology for coding multiple views of video data whereas 3DVC may generally define a video coding technology for coding one or more views of video data comprising multiple view components (i.e. a texture component and a depth component). Each view is a separate video slice or picture but may correspond to a different perspective, or angle, at which corresponding video data of a common scene was captured. A coded representation of a view in one time instance is a view component. In some examples, a view may contain both a texture component and a depth view component. The techniques of this disclosure generally relate to the handling and signaling of view dependencies for prediction of current video slices or pictures. More specifically, the techniques of this disclosure are related to signaling types of inter-prediction associated with dependent slices or pictures and generating a reference picture set based on the signaled inter-prediction types.

In one example, this disclosure describes a method of decoding video data, the method comprising obtaining, from a coded bitstream, layer dependencies associated with a given layer and obtaining, from a coded bitstream, a type of prediction associated with one or more of the layer dependencies.

In another example, this disclosure describes a method of encoding video data, the method comprising generating layer dependencies associated with a given layer and generating a type of prediction associated with one or more of the layer dependencies.

In another example, an apparatus for coding video data comprises one or more processors configured to code layer dependencies associated with a given layer and code a type of prediction associated with one or more of the layer dependencies.

In another example, this disclosure describes a device that codes video data, the device comprising means for coding layer dependencies associated with a given layer and means for coding a type of prediction associated with one or more of the layer dependencies.

In another example, this disclosure describes a non-transitory computer readable storage medium having stored thereon instructions that, when executed, cause one or more processors of an apparatus for coding video data to code layer dependencies associated with a given layer and code a type of prediction associated with one or more of the layer dependencies.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
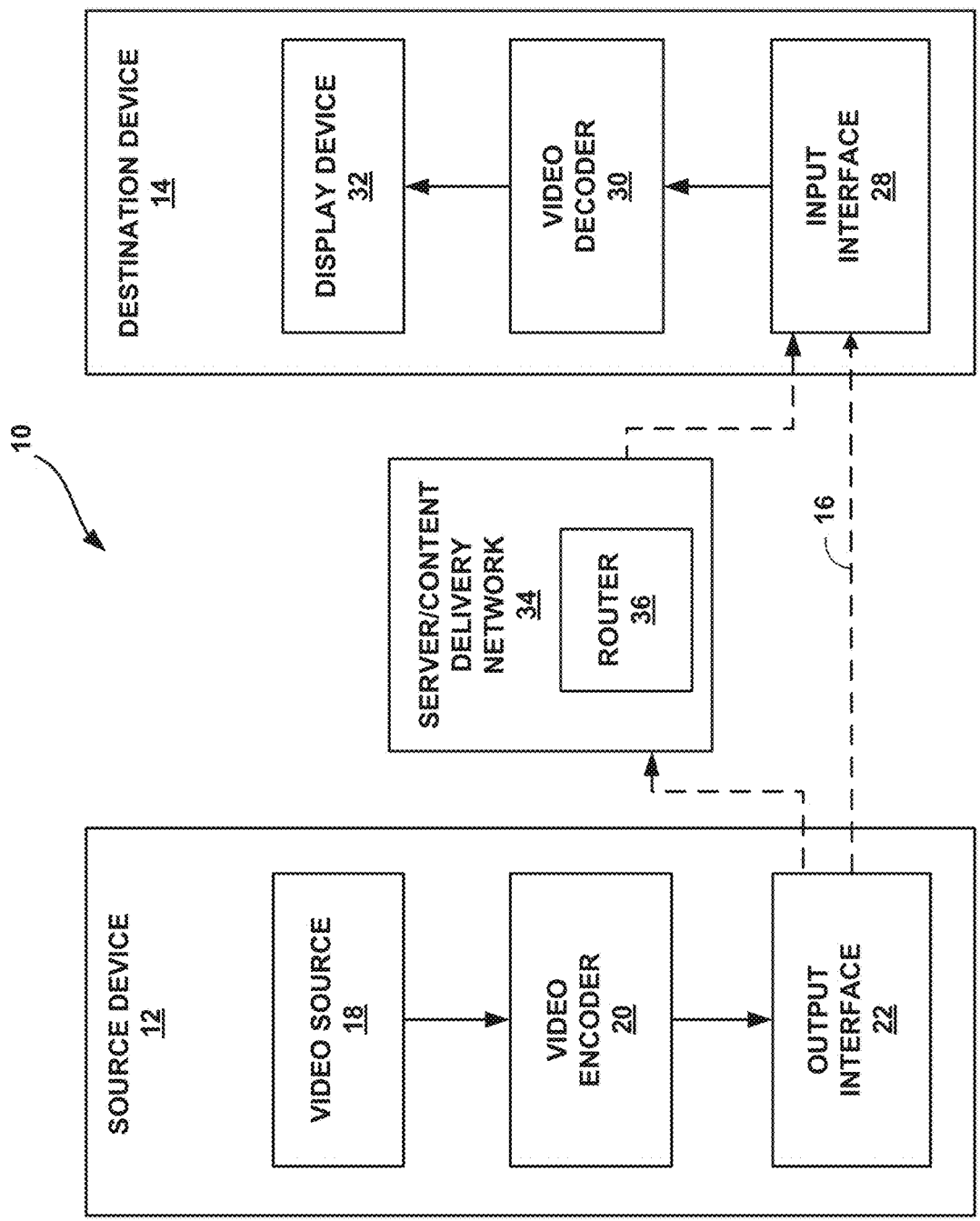
FIG. 1 is a block diagram illustrating an example video encoding and decoding system.

According to certain video coding systems, motion estimation and motion compensation may be used to reduce the temporal redundancy in a video sequence, so as to achieve data compression. In this case, a motion vector can be generated that identifies a predictive block of video data, e.g., a block from another video slice or picture, which can be used to predict the values of the current video block being coded. The values of the predictive video block are subtracted from the values of the current video block to produce a block of residual data. Motion information (e.g., a motion vector, motion vector indexes, prediction directions, or other information) is communicated from a video encoder to a video decoder, along with the residual data. The decoder can locate the same predictive block (based on the motion vector) and reconstruct the encoded video block by combining the residual data with the data of the predictive block.

Scalable video coding refers to video coding in which a base layer and one or more scalable enhancement layers are used. For scalable video coding, a base layer typically carries video data with a base level of quality. One or more enhancement layers carry additional video data to support higher spatial, temporal and/or signal-to-noise SNR levels (sometime called "quality" levels, as will be the custom throughout this specification). Enhancement layers may be defined relative to the previously encoded layer. Even as scalable video coding techniques introduces a concept of layers, the techniques still code based on slices or frames. For example, the frame or slice with the lowest temporal layer may form a temporal base layer which can be enhanced with slices or frames at higher temporal layers.

In some scalable video coding processes supporting temporal scalability, a base layer may include video data supporting a playback frame rate of 7.5 Hz. The video coding process may code additional layers supporting higher playback frame rates. For example, the video coding process may code one or more additional layers that support 15 Hz and 30 Hz playback frame rates. Based on the layers, the video coding process may support extractor tools that adapt the actual delivered content, in terms of frame rate, according to application requirements. The requirements may be dependent on the client devices or the transmission channel.

In some scalable video coding processes supporting spatial scalability, a base layer may include video data representing a specific, base resolution. The video coding process may code one or more additional layers which include video data representing higher resolutions. Similar to temporal scalability, an extractor tool may adjust the actual delivered content in terms of the actual resolution based on application requirements.

In some scalable video coding processes supporting quality scalability, a base layer may include video data representing a specific, base quality, sometimes referred to as a base SNR level. The video coding process may code one or more additional layers which include video data representing higher SNR level. Similar to temporal scalability, an extractor tool may adjust the actual delivered content in terms of the actual resolution based on application requirements.

Ultimately, the scalable video coding process may use all of the three types of layers in combination to produce results conforming to application requirements by extracting the necessary layers and adding the layers together.

Multi-view video coding is a video coding process for coding multiple views of video data. In general, each view corresponds to a different video slice or picture comprising a different perspective, or angle, at which corresponding video data of a common scene was captured. For instance, views from multiple angles corresponding to a common scene at a single time instance may be captured, thereby creating video data comprising multiple views corresponding to a single time instance. All of the views associated with a single time instance may be grouped into an "access unit." In multi-view video coding, each view may comprise only texture data (i.e. a texture component). Three dimensional video coding is another video coding process for coding multiple views of video data. Whereas the video data in multi-view video coding may only include a texture component for each view, 3D video data may include both a texture component and a depth component for each view. The texture components may include conventional pictures. The depth components may represent the three-dimensional depths of objects shown in corresponding texture components.

In some examples, similar to multi-view video coding techniques, 3DVC techniques may use multiple views in each access unit (i.e. the techniques may provide for multiple views). In such examples, the 3DVC techniques may employ many of coding techniques used in multi-view video. For example, in the 3DVC extensions to H.264/AVC and HEVC, a video encoder may encode a depth component in the same manner as other views of an access unit. That is, in addition to texture components for different views, an access unit may include a depth component. The term "view component" may be used to refer to either texture view components or the depth view component of an access unit.

Furthermore, some video coding techniques may use Depth Image Based Rendering (DIBR) to generate, based on available texture and depth view components, synthetic texture view components. A synthetic texture view component may be a texture view component that is synthesized based on a depth map and one or more texture view components. In some instances, a synthetic texture view component may be used as a reference picture for inter-access unit prediction or inter-view prediction. Synthetic texture view components that are used as reference pictures may be referred to as view synthesis reference pictures (VSRPs). Video coders may include VSRPs in reference picture lists. In some specific designs, a video coder may use multiple view components (with depth) to generate one VSRP through DIBR.

Accordingly, in a general sense, multi-view video data may be used interchangeably with 3D video data. For example, a video encoder and decoder may treat one view of a multi-view video bitstream as a depth component. In other examples, an encoder and decoder may operate to produce a depth view component from a multi-view video bitstream.

In a 3DVC technique, two or more views (e.g., left and right eye views of a human viewer) may be displayed simultaneously or near simultaneously using different polarizations of light, and a viewer may wear passive, polarized glasses such that each of the viewer's eyes receives a respective one of the views. Alternatively, the viewer may wear active glasses that shutter each eye independently, and a display may rapidly alternate between images of each eye in synchronization with the glasses.

While each view (e.g., left and right eye views) may be individually coded, in 3DVC, one of the views may be reconstructed from the other view using a depth component of the view. For this reason, this form of 3DVC may also be referred to as multi-view video coding plus depth (MVC+ D). To illustrate, a depth component, or "depth map" of a particular picture of a view (where this particular picture of a view may be referred to as a "view component" of the view) may be computed as a difference between the left eye view and the right eye view. The encoder may encode the left eye view, for example, as a so-called "texture component" of the view component and the depth map may be encoded as a so-called "depth component" of the view component.

The decoder may then decode the texture component of the view component and the depth component of the view component and reconstruct the right eye view from the texture component (which represents the left eye view) using the depth component. By encoding only one view and a corresponding depth map in this manner, 3DVC may more efficiently encode both the left eye and right eye view in comparison to encoding both the left eye view and the right eye view independently as separate views of the 3DVC data.

As discussed briefly above, certain video coding systems may generate motion estimation and compensation data in order to reduce redundancy in a video sequence. This motion data may include specific references to other video pictures or views where the reference video block is located. In some examples, the specific reference block will be in the same picture (intra-prediction). In other examples, the specific reference block may be in a different picture (inter-prediction) which is either ahead of or behind of the picture containing the current video block in ultimate output order (i.e. associated with a time instance in the past or the future relative to the current picture). In multi-view video coding and 3DVC, this concept may be extended to include predictive blocks in different views. For instance, the predictive block may be in a different picture associated with the same time instance as the current picture (inter-view prediction).

Inter-view prediction is generally realized as if the view component in another view is an inter prediction reference. Rather than using "motion" vectors for prediction, inter-view prediction utilizes a "disparity motion" vector, which are conceptually similar to motion vectors but describe displacement rather than motion. The potential inter-view references are signaled in the Sequence Parameter Set (SPS) and can be modified by the reference picture list construction process, which enables flexible ordering of the inter prediction or inter-view prediction references.

In video coding techniques that support scalable video coding, those video coding techniques may also employ inter-layer prediction. For example, similar to multi-view and 3D video coding, all of the layers (i.e. the base layer and any enhancement layers) of a particular slice or frame may form an access unit analogous to the access units described above with respect to multi-view and 3D video coding. Accordingly, given a specific layer, another layer may be an inter prediction reference. As with inter-view references, these inter-layer references may be signaled in the SPS and can be modified by the reference picture list construction process, which enables flexible ordering of the inter prediction or inter-layer prediction references.

In a general sense, texture view components, depth view components, and the various temporal, spatial, and quality layers may be thought of as somewhat interchangeable with respect to the present disclosure. For example, regardless of whether a video coding technique is dealing with texture view components, depth view components, or any of the various layers, the techniques may perform inter-prediction between the various components and layers. Accordingly, the techniques of the present invention may be thought of as applicable to "layers" in a general sense, where the layers may be any of texture view components, depth view components, temporal scalable layers, spatial scalable layers, and quality scalable layers. Below, the techniques of the present disclosure are described mainly with respect to views and view components. Additionally, in some areas, the techniques of the present disclosure are described with respect to SVC scalable layers, for instance temporal scalable layers, spatial scalable layers, and quality scalable layers. However, this is merely for ease of illustration and understanding. It should not be viewed as limiting the described techniques as applicable to only views and view components or necessarily scalable layers. On the contrary, it should be understood that the techniques described herein are more broadly applicable to general "layers" as the term is described above.

As part of an inter prediction process, a video encoder signal, in a bitstream, a reference picture set (RPS) of a particular view component. The reference picture set of the particular view component may include reference pictures that are available to be used for inter prediction of blocks within the particular view component. In multi-view coding and 3-dimensional video coding (3DVC), the video encoder may use view components of the same access unit as the particular view component as reference pictures for encoding the particular view component. However, in some video coding techniques, the video encoder may not signal such inter-view reference pictures in the reference picture set of the view component. This may decrease the efficiency of a video decoder that decodes the bitstream. Further, in some video coding techniques where the video encoder does signal such inter-view reference pictures in the reference picture set of the view component, the video encoder may not further signal a type of inter-prediction associated with the inter-view reference pictures. This may reduce coding efficiency by not allowing a video encoder to select inter-view reference pictures to include in an RPS based on the type of inter-prediction associated with the inter-view reference pictures.

Video data may be organized into Network Abstraction Layer (NAL) units, which provide a "network-friendly" video representation to address applications such as video telephony, storage, broadcast, or streaming. For example, a video encoder commonly encodes each picture of video data as one or more independently decodable slices. The slices may be packaged into NAL units for transmission across the network. NAL units including video coding layer (VCL) data may include data for a picture or data for a slice of a picture. For example, NAL units may include syntax information such as coded block pattern (CBP) values, block type, coding mode, maximum block size for a coded unit (such as a frame, slice, block, or sequence), or other information.

Each NAL unit includes a header that identifies a type of data stored in the NAL unit. An example multi-view video coding NAL unit header may include syntax elements indicating a view identifier for the view to which the NAL unit belongs, whether the NAL unit belongs to a so-called anchor picture that can be used as a random access point (for reference by other view components), whether the NAL unit is used for inter-view prediction for NAL units in other views, and a variety of other information. As described herein, an anchor picture may generally correspond to a random access picture, and such terms may be used interchangeably. That is, "random access" generally refers to the act of starting a decoding process for a bitstream at a point other than the beginning of the stream. A random access picture generally relates to a picture that contains only intra-coded slices (I-slices). Coded pictures that follow a random access picture in both decoding order and output order are not predicted from pictures preceding the random access picture, either in decoding order or output order.

In general, an access unit may include all view components of a particular time instance. A particular view component includes all NAL units of a particular view at a particular time instance. A multi-view video coding NAL unit may contain a one byte NAL unit header (including the NAL unit type) and may further include a multi-view video coding NAL unit header extension.

Ultimately, an encoder may generate and encode motion information for use in reconstruction of the current picture. Accordingly, the encoder may generate and encode motion information associated with each individual video block within the current picture. Since each video block may be independent from each other video block, the encoder may need to signal various different reference pictures in order for proper reconstruction of the entire current picture. Based on the reference pictures (some of which may be views) included in the motion information for each video block, the encoder may build a reference picture list comprising the pictures necessary to rebuild the current picture from the residual data.

The techniques of this disclosure generally relate to coding the types of inter-prediction associated with dependent views and the reference picture list construction process for inter-view prediction. For example, it may be inefficient to include reference views in a final reference picture list that are only used for inter-view texture prediction and not for other inter-view prediction types, such as inter-view motion prediction and inter-view residual prediction. By identifying and limiting the views included in the ultimate reference picture list to those used in both inter-view texture prediction and at least another type of inter-view prediction, to the extent possible, video coding efficiency may be gained.

For example, according to at least some aspects of this disclosure, the described video coding techniques may signal the dependencies in the sequence parameter sets (SPS). For each view, if another view (i.e. picture associated with the same time instance as the current picture) is used for any kind of inter-view prediction, it is signaled as a dependent view. However, another indication may also signal which view or views can be used for inter-view texture prediction, or equivalently, which views are only used for inter-view motion and/or residual prediction.

The following description should be understood to be in the context of both multi-view video coding techniques and 3D video coding techniques. Although 3D video data may include additional information (i.e. depth view components), the techniques described herein relate to view components generally. However, the described techniques may further apply uniquely to 3DVC in the context of depth view components. For example, an encoder may further signal that a reference view may be used for inter-view depth prediction.

FIG. 1 is a block diagram illustrating an example video encoding and decoding system 10. As shown in FIG. 1, system 10 includes a source device 12 that provides encoded video to a destination device 14 via a computer-readable medium 16. Source device 12 and destination device 14 may comprise any of a wide range of devices. The techniques of this disclosure may apply to over-the-air television broadcasts, cable television transmissions, satellite television transmissions, Internet video transmissions, encoded digital video that is encoded onto a storage medium, or other scenarios. Accordingly, computer-readable medium 16 may comprise any combination of wireless or wired media suitable for transmission of encoded video data, or computer-readable storage media such as discs, hard drives, or the like.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for multi-view coding or three-dimensional (3D) video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for multi-view video coding or 3D video coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, computer-readable medium 16 may comprise any wireless or wired communication medium, such as a radio frequency (RF) spectrum or one or more physical transmission lines, or any combination of wireless and wired media. Computer-readable medium 16 may form part of a packet-based network, such as a local area network, a wide-area network, or a global network such as the Internet. Computer-readable medium 16 generally represents any suitable communication medium, or collection of different communication media, for transmitting video data from source device 12 to destination device 14, including any suitable combination of wired or wireless media. Computer-readable medium 16 may include routers, switches, base stations, or any other equipment that may be useful to facilitate communication from source device 12 to destination device 14.

In the example shown in FIG. 1, system 10 also includes server/content delivery network 34, which may include network elements such as one or more routers 36. In some examples, source device 12 may communicate with server/content delivery network 34 via a variety of wireless and/or wired transmission or storage media, as described above. Moreover, while shown separately in the example of FIG. 1, in some examples, source device 12 and server/content delivery network 34 comprise the same device. Server/content delivery network 34 may store one or more versions of coded video data (from video encoder 20 of source device 12), and may make such coded video data available for access by destination device 14 and video decoder 30. In some examples, router 36 may be responsible for providing coded video data to destination device 14 in a requested format.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any legal bitstream conforming to MVC-based 3DV always contain a sub-bitstream that is compliant to a MVC profile, e.g., stereo high profile. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual, or the forthcoming HEVC standard, as described herein.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC). An apparatus including video encoder 20 and/or video decoder 30 may comprise an integrated circuit, a microprocessor, and/or a wireless communication device, such as a cellular telephone. Other apparatus may include cameras, computers, mobile devices, subscriber devices, broadcast devices, set-top boxes, servers, or the like.

In accordance with examples of the disclosure described in more detail below, video decoder 30 of FIG. 1 may be configured to receive view dependencies associated with a given view and receive a type of prediction associated with one or more of the view dependencies.

Initially, the multi-view video coding techniques of extensions of the H.264/Advanced Video Coding (AVC) standard will be discussed. This specific implementation of multi-view video coding may be referred to in this disclosure as "MVC/AVC". However, the techniques of this disclosure may be applicable with any video coding standard or technique that supports multi-view coding, including multiview proposals for the emerging HEVC standards. As noted above, the techniques of the present disclosure may further be applicable to any video coding standard or technique which includes 3DVC abilities, as 3D video data may include multiple views or samples associated with a single time instance, or multiple views or samples may generated from at least one view component and one depth component.

Figure 2:
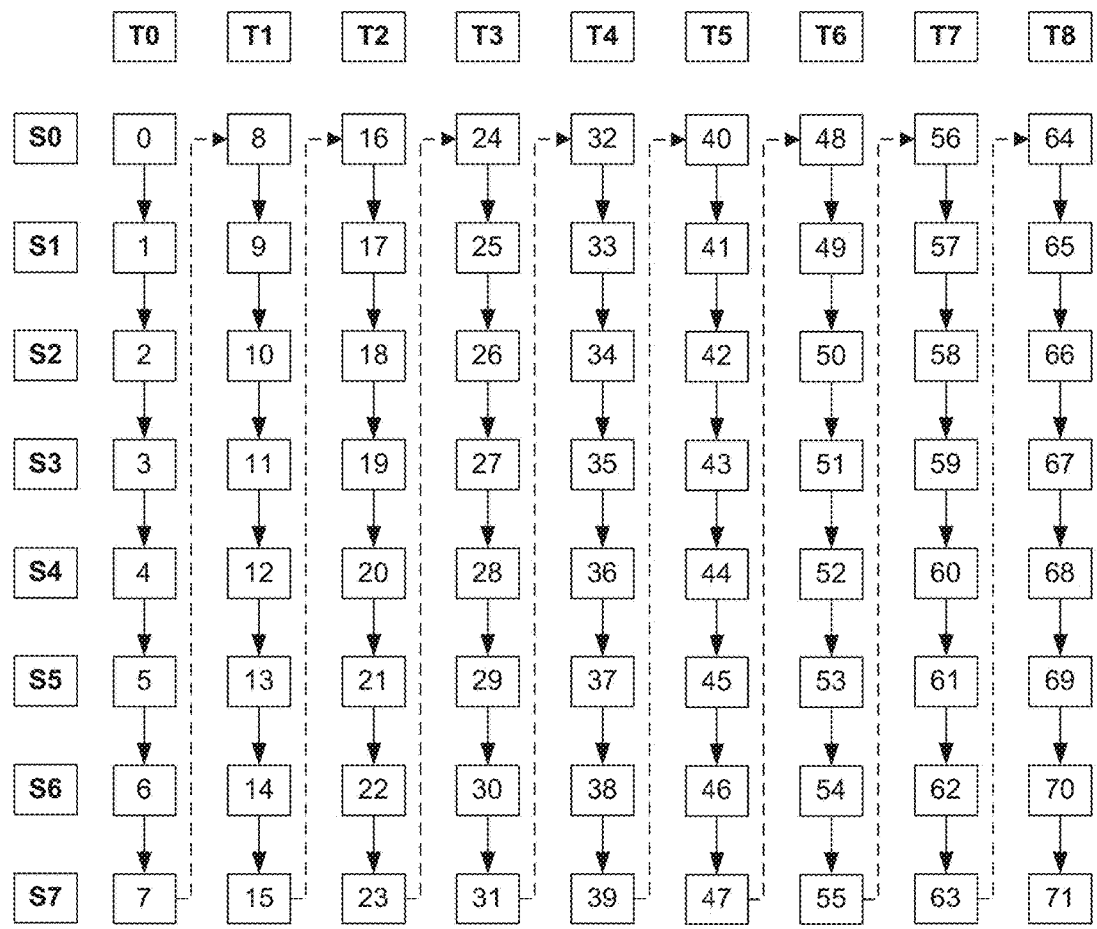
FIG. 2 is a conceptual diagram that illustrates an example time-first coding.

A typical MVC/AVC decoding order (i.e. bitstream order) is shown in FIG. 2. The decoding order arrangement is referred as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

As discussed briefly above, the disclosure may use the following definitions:

view component: A coded representation of a view in a single access unit. When a view includes both coded texture and depth representations, a view component consists of a texture view component and a depth view component.

texture view component: A coded representation of the texture of a view in a single access unit.

depth view component: A coded representation of the depth of a view in a single access unit.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component is a gray scale image that includes only luma values. In other words, the depth view component may not convey any textural image content, but rather, the depth view component may provide a measure of the relative depths of the different pixels defined in the texture view component. The depth values in the depth view components may define the depth of the respective pixels relative to a zero disparity plane, or possibly some other reference.

Conceptually, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose. The depth view component using only luma values (e.g., intensity values) to identify depth is provided for illustration purposes and should not be considered limiting.

In a more general sense, the depth view components may comprise values ranging from a minimum value to a maximum value. According to one specific frame of reference, a pixel in the depth view component having a maximum depth value may define the depth of a respective pixel in the texture view component as further away from the viewer relative to a pixel in the texture view component corresponding to pixel in the depth-view component having a lower value. Consequently, a pixel in the depth view component having a minimum depth value may define the depth of a respective pixel in the texture view component as closer to the viewer relative to a pixel in the texture view component corresponding to pixel in the depth-view component having a higher value. In other examples, the frame of reference may be defined differently. For example, the frame of reference may be defined such that the meaning of the relatively higher and lower values is reversed. That is relatively lower values may correspond to a depth that is further away from the viewer and higher values may correspond to a depth that is closer to the view. In other examples, any technique may be utilized to indicate relative depths of the pixels in the texture view component.

Figure 3:
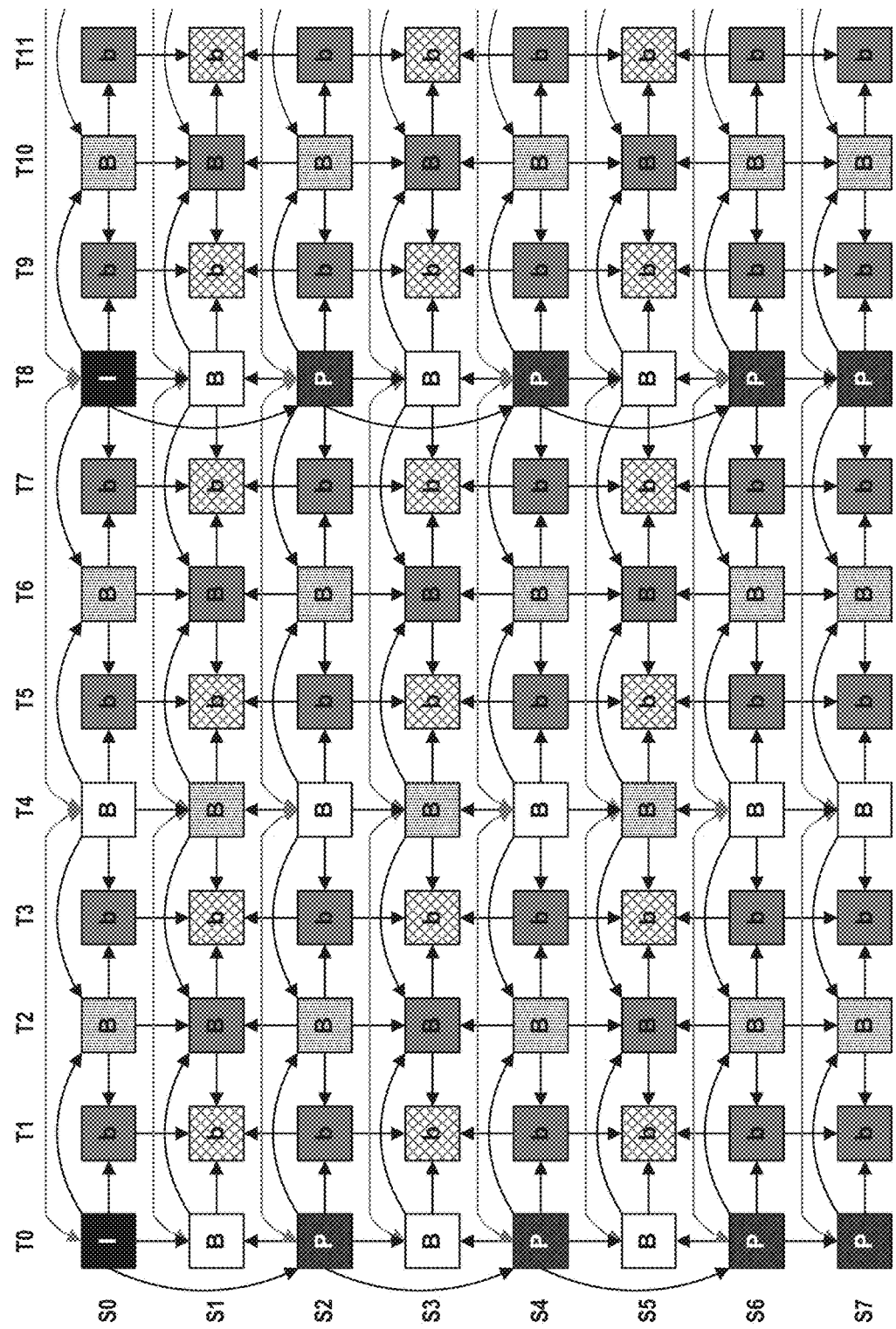
FIG. 3 is a conceptual diagram that illustrates an example multi-view coding temporal and inter-view prediction structure.

A typical MVC/AVC prediction structure (including both inter-picture prediction within each view and inter-view prediction) for multi-view video coding is shown in FIG. 3.

Prediction directions are indicated by arrows, the pointed-to object using the pointed-from object as the prediction reference. In MVC/AVC, inter-view prediction is supported by disparity motion compensation, which uses the syntax of the H.264/AVC motion compensation, but allows a picture in a different view to be used as a reference picture.

FIG. 3 is a conceptual diagram illustrating an example MVC/AVC prediction pattern. In the example of FIG. 3, eight views are illustrated, and twelve temporal locations are illustrated for each view. In general, each row in FIG. 3 corresponds to a view, while each column indicates a temporal location. Each of the views may be identified using a view identifier ("view_id"), which may be used to indicate a relative camera location with respect to the other views. In the example shown in FIG. 3, the view IDs are indicated as "S0" through "S7", although numeric view IDs may also be used. In addition, each of the temporal locations may be identified using a picture order count (POC) value, which indicates a display order of the pictures. In the example shown in FIG. 3, the POC values are indicated as "T0" through "T11."

Although MVC/AVC has a so-called base view, which is decodable by H.264/AVC decoders, and stereo view pairs could be supported also by MVC/AVC, the advantage of MVC/AVC is that it could support an example that uses more than two views as a 3D video input and decodes this 3D video represented by the multiple views. A renderer of a client having an MVC/AVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

Pictures in FIG. 3 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0. Each of the pictures shown in FIG. 3 may be referred to as a view component. That is, a view component of a view corresponds to particular temporal instance of the view.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC/AVC, for example, inter-view prediction is realized as if the view component in another view is an inter-prediction reference. The potential inter-view references are signaled in the Sequence Parameter Set (SPS) MVC/AVC extension and can be modified by the reference picture list construction process, which enables flexible ordering of the inter-prediction or inter-view prediction references. Inter-view prediction is also a feature of proposed multi-view extension of HEVC, including 3D-HEVC (multi-view plus depth).

FIG. 3 provides various examples of inter-view prediction. Pictures of view S1, in the example of FIG. 3, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 3, capital "B" and lowercase "b" are intended to indicate different hierarchical relationships between pictures, rather than different encoding methodologies. In general, capital "B" frames are relatively higher in the prediction hierarchy than lowercase "b" frames. FIG. 3 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 3 are illustrated with full shading, while P-frames have a somewhat lighter shading, and B-frames (and lowercase b-frames) have various levels of shading relative to each other, but always lighter than the shading of the P-frames and the I-frames. In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS.

In this manner, pictures used as reference pictures may be decoded before decoding the pictures that are encoded with reference to the reference pictures. A view order index is an index that indicates the decoding order of view components in an access unit. According to MVC/AVC, for each view order index i, the corresponding view_id is signaled. The decoding of the view components follows the ascending order of the view order indexes. If all the views are presented, then the set of view order indexes comprises a consecutively ordered set from zero to one less than the full number of views.

In some instances, a subset of a whole bitstream can be extracted to form a sub-bitstream which still conforms to MVC/AVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require smooth viewing experience and might prefer views with view_id values S0, S1, and S2, while another other client may require view scalability and prefer views with view_id values S0, S2, and S4. Both of these sub-bitstreams can be decoded as independent MVC bitstreams and can be supported simultaneously.

In general, camera position, orientation, and geometrical relation between different views can be inferred from View ID or View Order Index. For this purpose, both intrinsic and extrinsic camera parameters may be included in the bitstream using a Multiview Acquisition Information SEI message.

While FIG. 3 shows eight views (S0-S7), as noted above, the MVC/AVC extension supports up to 1024 views and uses a view_id in a NAL unit header to identify the view to which a NAL unit belongs. According to aspects of this disclosure, a view order index may be signaled as part of a NAL unit header. That is, for purposes of comparison, a view order index may replace the view_id that is signaled in the NAL unit header of the MVC/AVC extension. View order generally describes the ordering of the views in an access unit, and a view order index identifies a particular view in view order of the access unit. That is, a view order index describes the decoding order of a corresponding view component of an access unit.

In some examples, FIG. 3 may be viewed as illustrating the texture view components. For example, the I-, P-, B-, and b-pictures illustrated in FIG. 2 may be considered as texture view components for each of the views. In accordance with at least some techniques described in this disclosure, for each of the texture view components illustrated in FIG. 3 there may a corresponding depth view component. For example, as described above, the techniques of the present disclosure may be applied to video coding standards including 3DV coding standards which incorporate both texture and depth view components. Alternatively, in at least some examples, the techniques of the present disclosure may also relate to coding standards which include multi-view compatibility and only incorporate texture view components. In some examples, the depth view components may be predicted in a manner similar to that illustrated in FIG. 3 for the corresponding texture view components.

Coding of two views may also be supported by MVC/AVC. One of the advantages of MVC/AVC is that an MVC/AVC encoder may take more than two views as a 3D video input and an MVC/AVC decoder may decode such a multi-view representation. As such, any renderer with an MVC/AVC decoder may decode 3D video content with more than two views.

As discussed above, in MVC/AVC, inter-view prediction is allowed among pictures in the same access unit (meaning, in some instances, with the same time instance). When coding a picture in one of the non-base views, a picture may be added into a reference picture list, if it is in a different view but within a same time instance. An inter-view prediction reference picture may be put in any position of a reference picture list, just like any inter-prediction reference picture. As shown in FIG. 3, a view component can use the view components in other views for reference. In MVC/AVC, inter-view prediction is realized as if the view component in another view was an inter-prediction reference.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a block or a partition of a block. The video blocks may have fixed or varying sizes, and may differ in size according to a specified coding standard. Each video frame may include a plurality of slices. Each slice may include a plurality of blocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Efforts are currently in progress to develop a new video coding standard, currently referred to as High Efficiency Video Coding (HEVC). The emerging HEVC standard may also be referred to as the ITU H.265 standard. The standardization efforts are based on a model of a video coding device referred to as the HEVC Test Model (HM). The HM presumes several capabilities of video coding devices over devices according to, e.g., ITU-T H.264/AVC.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit (LCU) of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape. Additionally, a TU is not necessarily limited to the size of a PU. Thus, TUs may be larger or smaller than corresponding PUs for the same CU. In some examples, the maximum size of a TU may correspond to the size of the corresponding CU.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

As noted above, intra-prediction includes predicting a PU of a current CU of a picture from previously coded CUs of the same picture. More specifically, a video encoder may intra-predict a current CU of a picture using a particular intra-prediction mode. An HM encoder may be configured with up to thirty-three intra-prediction modes. Therefore, to support a one-to-one mapping between directional intra-prediction modes and directional transforms, HM encoders and decoders may need to store 66 matrices for each supported transform size. Furthermore, the block sizes for which all thirty-three intra-prediction modes are supported may be relatively large blocks, e.g., 32×32 pixels, 64×64 pixels, or even larger.

A video sequence typically includes a series of pictures (or, interchangeably, "frames"). A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The residual value generally corresponds to the difference between the predicted data for the block and the true value of the block. To further compress the residual value of a block, the residual value may be transformed into a set of transform coefficients that compact as much data (also referred to as "energy") as possible into as few coefficients as possible. The transform coefficients correspond to a two-dimensional matrix of coefficients that may be the same size as the original block. In other words, there may be as many transform coefficients as pixels in the original block. However, due to the transform, many of the transform coefficients may have values equal to zero.

The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally involves mapping values within a relatively large range to values in a relatively small range, thus reducing the amount of data needed to represent the quantized transform coefficients. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data. For example, coefficient values, represented as magnitudes and corresponding signs (e.g., "+1," or "−1") for the quantized transform coefficients may be encoded using the entropy coding techniques.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

In some examples, video encoder 20 may generate and video decoder 30 may receive certain parameter sets, which may be used when decoding video data. For example, parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence (e.g., sequence of pictures) or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as Supplemental Enhancement Information (SEI) NAL units.

SEI NAL units (referred to as SEI messages) may contain information that is not necessary for decoding the coded pictures samples from VCL NAL units, but may assist in processes related to decoding, display, error resilience, and other purposes. SEI messages may be contained in non-VCL NAL units. SEI messages may be included in the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC.

In some examples, video encoder 20 may encode an multi-view video bitstream that conforms to MVC/AVC. Likewise, video decoder 30 may decode a multi-view video bitstream that conforms to MVC/AVC. The latest joint draft of MVC/AVC is described in "Advanced video coding for generic audiovisual services," ITU-T Recommendation H.264, March 2010, the entirety of which is incorporated herein by reference.

An MVC/AVC NAL unit may contain a one byte NAL unit header that includes the NAL unit type, as well as an MVC/AVC NAL unit header extension, extending the NAL unit header to 4-bytes. As one example, the MVC/AVC NAL unit header extension may include the syntax elements in the following Table 1:

TABLE 1

NAL UNIT HEADER EXENSION SYNTAX

| nal_unit_header_extension( ) { | C | Descriptor |
|---|---|---|
| reserved_zero_bit | All | u(1) |
| idr_flag | All | u(1) |
| priority_id | All | u(6) |
| view_id | All | u(10) |
| temporal_id | All | u(3) |
| anchor_pic_flag | All | u(1) |
| inter_view_flag | All | u(1) |
| reserved_one_bit | All | u(1) |
| } | | |

In Table 1 above, the idr_flag element may indicate whether the NAL unit belongs to an instant decode refresh (IDR) or a view-IDR (V-IDR) picture that can be used as a closed-GOP random access point. For example, an IDR picture and all of the pictures succeeding the IDR picture in both a display order and bitstream order can be properly decoded without decoding previous pictures in either bitstream order or display order. The priority_id element may be used with a bitstream adaptation process that varies the bitstream according to changing network conditions and/or capabilities of video decoder 30 and/or display device 32 (e.g., such as single-pass adaptation process). The view_id element may be used to indicate the view identifier for the view to which the NAL unit belongs, which may be used inside an MVC/AVC decoder, e.g., for inter-view prediction and outside a decoder, e.g., for rendering. In some instances, the view_id may be set equal to a predefined camera id, and may be relatively large. The temporal_id element may be used to indicate the temporal level of the current NAL unit, which may correspond to a particular frame rate.

The anchor_pic_flag element may be used to indicate whether the NAL unit belongs to an anchor picture that can be used as an open-GOP random access point. For example, anchor pictures and all the pictures succeeding the anchor picture in display order may be properly decoded without decoding previous pictures in the decoding order (i.e. bitstream order) and thus may be used as random access points. Anchor pictures and non-anchor pictures may have different view dependencies, both of which may be signaled in an SPS. That is, as described herein a, a view dependency may generally refer to a view from which a view currently being coded depends. In other words, view dependencies may set forth from which views a view currently being coded may be predicted. According to some examples, view dependency may be signaled in the SPS MVC/AVC extension. In such examples, all inter-view prediction may be done within the scope specified by the SPS MVC/AVC extension. The inter_view_flag element may be used to indicate whether the NAL unit is used for inter-view prediction for NAL units in other views.

To convey the above 4-byte NAL unit header information for the base view of an MVC/AVC bitstream, a prefix NAL unit may be defined in MVC/AVC. In the context of MVC/AVC, the base view access unit may include the VCL NAL units of a current time instance of a particular view, as well as a prefix NAL unit for the base view access unit, which may contain only the NAL unit header. If the prefix NAL unit is not required for decoding (e.g., such as decoding a single view), a decoder may ignore and/or discard the prefix NAL unit.

With respect to an SPS MVC/AVC extension, the MVC/AVC SPS may indicate views that may be used for purposes of inter-view prediction. For example, potential inter-view references may be signaled in an SPS MVC/AVC extension, and may be modified by the reference picture list construction process, which enables flexible ordering of the inter prediction or inter-view prediction references. An example MVC/AVC SPS is set forth in Table 2 below:

TABLE 2

EXAMPLE MVC SPS

| seq_parameter_set_mvc_extension( ) { | C | Descriptor |
|---|---|---|
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |
|   num_anchor_refs_l1[ i ] | 0 | ue(v) |
|   for( j = 0; j < num_anchor_refs_l1[ i ]; j++ ) | | |
|     anchor_ref_l1[ i ][ j ] | 0 | ue(v) |
| } | | |
| for( i = 1; i <= num_views_minus1; i++ ) { | | |
|   num_non_anchor_refs_l0[ i ] | 0 | ue(v) |
|   for( j = 0; j < num_non_anchor_refs_l0[ i ]; j++ ) | | |
|     non_anchor_ref_l0[ i ][ j ] | 0 | ue(v) |
|   num_non_anchor_refs_l1[ i ] | 0 | ue(v) |
|   for( j = 0; j < num_non_anchor_refs_l1 [ i ]; j++ ) | | |
|     non_anchor_ref_l1[ i ][ j ] | 0 | ue(v) |
| } | | |

TABLE 2-continued

EXAMPLE MVC SPS

| seq_parameter_set_mvc_extension( ) { | C | Descriptor |
|---|---|---|
|   num_level_values_signalled_minus1 | 0 | ue(v) |
|   for( i = 0; i <= num_level_values_signalled_minus1 i++ ) { | | |
|     level_idc[ i ] | 0 | u(8) |
|     num_applicable_ops_minus1[ i ] | 0 | ue(v) |
|     for( j = 0; j <= num_applicable_ops_minus1[ i ]; j++ ) { | | |
|       applicable_op_temporal_id[ i ][ j ] | 0 | u(3) |
|       applicable_op_num_target_views_minus1[ i ][ j ] | 0 | ue(v) |
|       for( k = 0; k <= applicable_op_num_target_views_minus1[ i ][ j ]; k++ ) | | |
|         applicable_op_target_view_id[ i ][ j ][ k ] | 0 | ue(v) |
|       applicable_op_num_views_minus1[ i ][ j ] | 0 | ue(v) |
|     } | | |
|   } | | |
| } | | |

According to some examples, view dependency may be signaled in the SPS MVC/AVC extension. All inter-view prediction may be done within the scope specified by the SPS MVC/AVC extension. That is, the SPS may set forth which views may be referred to for purposes of prediction by a view currently being coded. In Table 2 above, the num_anchor_refs_l0[i] element may specify the number of view components for inter-view prediction in the initialized reference picture list for List 0 (e.g., RefPicList0). In addition, the anchor_ref_l0[i][j] element may specify the view_id of the j-th view component for inter-view prediction in the initialized RefPicList0. The num_anchor_refs_l1[i] element may specify the number of view components for inter-view prediction in the initialized reference picture list for list one (e.g., RefPicList1). The anchor_ref_l1[i][j] element may specify the view_id of the j-th view component for inter-view prediction in the initialized RefPicList1. The num_non_anchor_refs_l0[i] element may specify the number of view components for inter-view prediction in the initialized RefPicList0. The non_anchor_ref_l0 [i][j] element may specify the view_id of the j-th view component for inter-view prediction in the initialized RefPicList0. The num_non_anchor_refs_l1[i] element may specify the number of view components for inter-view prediction in the initialized RefPicList1. The non_anchor_ref_l1[i][j] element may specify the view_id of the j-th view component for inter-view prediction in the initialized RefPicList.

The initialized, or "initial", reference picture list may be the same or different from a final reference picture list used for purposes of inter-view predicting view components. That is, certain reference candidates (i.e., reference pictures that may be used for inter-view prediction) may be removed from an initial reference picture list (e.g., redundant pictures), such as during a reference picture list modification process. In addition, as described in greater detail below, reference candidates may be reordered from the initial reference picture list to form the final reference picture list.

In this example, according to MVC/AVC, view dependencies for anchor pictures and non-anchor pictures are separately maintained and signaled. That is, a video coder may determine a total of four reference picture lists (e.g., List 0, non-anchor pictures; List 1, non-anchor pictures; List 0, anchor pictures; List 1, anchor pictures). In addition, as shown in Table 2 above, separate signaling is required to indicate a view dependency to video decoder 30. That is, the SPS must include separate List 0 and List 1 signaling for both anchor_refs and non_anchor_refs.

Moreover, according to Table 2, the inter-view dependency for non-anchor view components is a subset of that for anchor view components. That is, for example, a view component of an anchor view may be predicted from more than one other view, such as view 3 and 4. A non-anchor view, however, may only be predicted from pictures of view 3 (a subset of the anchor view). In this way, the view dependencies for anchor and non-anchor view components may be separately maintained.

In addition, in Table 2, the num_level_values_signalled may specify the number of level values signaled for the coded video sequence. The level_idc[i] element may specify the i-th level value signaled for the coded video sequence. The num_applicable_ops_minus1[i] plus 1 element may specify the number of operation points to which the level indicated by level_idc1[i] applies. The applicable_op_temporal_id[i][j] element may specify the temporal_id of the j-th operation point to which the level indicated by level_idc [i] applies. The applicable_op_num_target_views_minus1 [i][j] element may specify the number of target output views for the j-th operation point to which the level indicated by level_idc[i] applies. The applicable_op_target_view_id[i][j] [k] element may specify the k-th target output view for the j-th operation point to which the level indicated by level_idc [i] applies. The applicable_op_num_views_minus1[i][j] element may specify the number of views, including the views that are dependent on by the target output views but that do not belong to the target output views, in the j-th operation point to which the level indicated by level_idc[i] applies.

Accordingly, in the SPS MVC/AVC extension, for each view, the number of views that may be used to form reference picture List 0 and reference picture List 1 may be signaled. In addition, the prediction relationship for an anchor picture, as signaled in the SPS MVC/AVC extension, may be different from the prediction relationship for the non-anchor picture (signaled in the SPS MVC/AVC extension) of the same view.

As described in greater detail below, video encoder 20 and video decoder 30 may flexibly arrange temporal and view prediction references when constructing reference picture lists. Allowing flexible arrangement provides not only potential coding efficiency gain, but also error resilience, because reference picture section and redundant picture mechanisms may be extended to the view dimension. Video encoder 20 and/or video decoder 30 may, in an example, construct a reference picture list according to the following steps:

1) Initialize the reference picture list for temporal (i.e., intra-view) reference pictures, such that reference pictures from other views are not considered.
2) Append the inter-view reference pictures to the end of the list in the order in which the pictures occur in the MVC/AVC SPS extension.
3) Apply a reference picture list reordering (RPLR) process for both intra-view and inter-view reference pictures. Inter-view reference pictures may be identified in the RPLR commands by their index values as specified in the MVC SPS extension.

As described above, H.264/AVC includes MVC support as MVC/AVC. However, MVC/AVC may contain several inefficiencies with respect to other video coding standards. Specifically, MVC/AVC may contain several inefficiencies related to signaling view dependencies. Also as described previously, the techniques of the present disclosure may be implemented in other video coding standards or using video coding techniques different from those included in MVC/AVC. Some example implementations of video coding techniques that differ from MVC/AVC which may increase coding efficiency with respect to modification of view dependency signaling are described in U.S. Utility patent application Ser. No. 13/559,269, titled "CODING STEREO DATA" and filed Jul. 26, 2012, the entirety of which is incorporated herein by reference. Accordingly, encoder 20 may operate according to the following description which differs from the MVC/AVC multi-view video coding technique.

As one example, the H.264/MVC standard supports up to 1024 views and uses a view identifier (view_id) in a NAL unit header to identify the view to which a NAL unit belongs. Because the view id is 10 bits long, over 1000 different views can be uniquely identified by the view id values. However, many three-dimensional (3D) video applications require considerably fewer views. Moreover, fewer views may be required for 3D video applications that use view synthesis to generate more views (which do not require coding). According to the MVC/AVC extension, the NAL unit header includes a 10 bit view id that is always provided. The view id may substantially increase the number of bits for the NAL unit header, which occupies a relatively large portion of the bitstream.

For example, a view order index ("view_order_index" or "view_idx") may be signaled as part of a NAL unit header. That is, video encoder 20 may encode and transmit, and video decoder 30 may receive and decode, a view order index as part of a NAL unit header. For purposes of comparison, the view order index may replace the view id that is signaled in the NAL unit header of the MVC/AVC. That is, for example, view_idx may replace view_id in a NAL unit header.

As discussed above, MVC/AVC provides inter-view prediction. Accordingly, views used for reference (that is, views that are used to predict other views) must occur in coding order earlier than the referring views, as discussed above. View order generally describes the ordering of the views in an access unit, and a view order index identifies a particular view in view order of the access unit. That is, a view order index describes the decoding order of a corresponding view component of an access unit.

An SPS may provide a relationship between view ids (view_ids) for the views and view order indexes for the views. As one example, using the view order index and the data in the SPS, video encoder 20 and video decoder 30 may replace the 10 bit view_id of MVC/AVC in the NAL unit header by the view order index. For example, a view order index may include substantially fewer than 10 bits (e.g., such as 2 bits, 3 bits, or the like).

An example SPS that provides a relationship between view_ids for the views and view order indexes is provided in Table 6 below:

TABLE 3

SEQUENCE PARAMETER SET MVC EXTENSION

| seq_parameter_set_mvc_extension( ) { | C | Descriptor |
|---|---|---|
| num_views_minus1 | 0 | ue(v) |
| for( i = 0; i <= num_views_minus1; i++ ) { | | |
|   view_id[ i ] | 0 | ue(v) |
|   *view_level[i]* | 0 | ue(v) |
| } | | |
| *for(i = 1; i<= num_views_minus1; i++) {* | | |
|   *num_ref_views[i]* | 0 | ue(v) |
|   *for(j = 0; j < num_ref_views[i]; j++)* | | |
|     *ref_view_idx[i][j]* | 0 | ue(v) |
| } | | |
| num_level_values_signalled_minus1 | 0 | ue(v) |
| for( i = 0; i <= num_level_values_signalled_minus1; i++ ) { | | |
|   level_idc[ i ] | 0 | u(8) |
|   num_applicable_ops_minus1[ i ] | 0 | ue(v) |
|   for( j = 0; j <= num_applicable_ops_minus1[ i ]; j++ ) { | | |
|     applicable_op_temporal_id[ i ][ j ] | 0 | u(3) |
|     applicable_op_num_target_views_minus1[ i ][ j ] | 0 | ue(v) |
|     for( k = 0; k <= applicable_op_num_target_views_minus1[ i ][ j ]; k++ ) | | |
|       *applicable_op_target_view_idx[i][j][k]* | 0 | ue(v) |
|     applicable_op_num_views_minus1[ i ][ j ] | 0 | ue(v) |
|   } | | |
| } | | |
| } | | |

In the example shown in Table 3, the bold and italicized syntax elements indicate departures from MVC/AVC SPS syntax, that is, modifications relative to a previously-defined MVC/AVC SPS syntax. For example, the SPS shown in Table 3 specifies inter-view dependency relationships for a coded video sequence. The SPS also specifies level values for a subset of the operation points for the coded video sequence. All SPSs that are referred to by a coded video sequence should be identical. However, some views identified by view_id[i] may not be present in the coded video sequence. In addition, some views or temporal subsets described by the SPS may have been removed from the original coded video sequence, and thus may not be present in the coded video sequence. The information in the SPS, however, may always apply to the remaining views and temporal subsets.

In Table 3 above, the num_views_minus1 plus 1 element may specify the maximum number of coded views in the coded video sequence. The value of num_view_minus1 may be in the range of 0 to 31, inclusive. In some instances, the actual number of views in the coded video sequence may be less than num_views_minus1 plus 1. The view_id[i] element may specify the view identifier of the view with a view order index equal to i. The view_level[i] element may specify the view_level of the view with a view order index equal to i. In some examples, all view components with a view_level up to a predefined value (VL) may be decodable without decoding any view component with a view_level larger than VL.

According to some examples, the num_ref_views[i] element may specify the number of view components for inter-view prediction in the initial reference picture list RefPicList0 and RefPicList1 when decoding view components with view order index equal to i. The value of the num_ref_views[i] element may not be greater than Min(15, num_views_minus1). The value of num_ref_views[0] may be equal to 0. In addition, according to aspects of this disclosure, the ref_view_idx[i][j] element may specify the view order index of the j-th view component for inter-view prediction in the initial reference picture list RefPicList0 and RefPicList1 when decoding a view component with view order index equal to i. The value of ref_view_idx[i][j] may be in the range of 0 to 31, inclusive.

Accordingly, in various examples, view dependencies for anchor pictures and non-anchor pictures may no longer be required to be separately maintained and signaled. That is, video encoder 20 and/or video encoder 30 may use a single reference picture list (or maintain two reference picture lists, List 0 and List 1) for anchor pictures and non-anchor pictures alike. In this way, as shown in Table 3 above, separate signaling is not required to indicate a view dependency to video decoder 30. Rather, the SPS includes ref_view_idx, which may be used to construct both List 0 and List 1 for view components.

According to such examples, for example, video decoder 30 may receive, for any view component a first view, reference view information indicating one or more reference views for predicting view components of the first view. That is, video decoder 30 may receive reference view information indicating view dependencies for anchor pictures of a view and non-anchor pictures of a view alike. When decoding a particular picture (of an access unit) of a particular view, then, video decoder 30 may include reference candidates (e.g., view components from which the particular picture can be predicted from) from the same access unit as the particular picture and from the reference views indicated by the reference view information. In some instances, video decoder 30 may add reference candidates to the reference picture list from each reference view, such that the number of reference candidates is equal to the number of reference views. In addition, video decoder 30 may add reference candidates to either List 1, List 0, or both. Video decoder 30 may then decode the particular picture based on one of the reference pictures in the reference picture list.

Moreover, according to Table 3, the inter-view dependency for non-anchor view components may no longer be signaled in an SPS as a subset of inter-view dependency for anchor view components. Rather, a view component of an anchor view may be predicted from more than one other view, such as view 3 and 4, and a non-anchor view may also be predicted from pictures of view 3 and view 4. If an additional restriction view dependency restriction is desired for non-anchor pictures, such a restriction may be provided in supplemental signaling, such as an SEI message.

The num_level_values_signalled_minus1 plus 1 element may specify the number of level values signalled for the coded video sequence. The value of the num_level_values_signalled_minus1 may be in the range of 0 to 63, inclusive. The level_idc[i] element may specify the i-th level value signalled for the coded video sequence. The num_applicable_ops_minus1[i] plus 1 element may specify the number of operation points to which the level indicated by level_idc[i] applies. The value of the num_applicable_ops_minus1[i] element may be in the range of 0 to 1023, inclusive. The applicable_op_temporal_id[i][j] element may specify the temporal_id of the j-th operation point to which the level indicated by level_idc[i] applies. The applicable_op_num_target_views_minus1[i][j] plus 1 element may specify the number of target output views for the j-th operation point to which the level indicated by level_idc[i] applies. The value of the applicable_op_num_target_views_minus1[i][j] element may be in the range of 0 to 1023, inclusive.

The applicable_op_target_view_idx[i][j][k] element may specify the view order index of the k-th target output view for the j-th operation point to which the level indicated by level_idc[i] applies. The value of the applicable_op_target_view_idx[i][j][k] element may be in the range of 0 to 31, inclusive. The applicable_op_num_views_minus1[i][j] plus 1 may specify the number of views required for decoding the target output views corresponding to the j-th operation point to which the level indicated by level_idc[i] applies. The number of views specified by the applicable_op_num_views_minus1 may include the target output views and the views that the target output views depend on as specified by a sub-bitstream extraction process.

In another example, the value of ref_view_idx[i][j] may be required to be smaller than i, based on a decoding order of the view components in the same time instance.

The ref_view_idx[i][j] may be further reduced in size (for additional bit savings versus MVC/AVC). For example, an additional bit savings may be achieved in a multi-view video coding stream that includes only two views (that is, for stereo video). In this example, a view order index may not be needed, as video decoder 30 may always decode a first view (e.g., view 0) prior to decoding a second view (e.g., view 1). An example reduced SPS is provided in Table 4 below:

TABLE 4

SEQUENCE PARAMETER SET MVC EXTENSION

| seq_parameter_set_mvc_extension( ) { | Descriptor |
|---|---|
| ... | ue(v) |
| for(i = 1; i<= num_views_minus1; i++) { | |
|   num_ref_views[i] | ue(v) |
|   for(j = 0; j < num_ref_views[i]; j++) | |
|     ref_view_idx_diff_minus1[i][j] | ue(v) |
| ... | |

In the example shown in Table 4, the ref_view_idx_diff_minus1[i][j] plus i+1 element may specify the view order index of the j-th view component for inter-view prediction in the initial reference picture list RefPicList0 and RefPicList1 when decoding a view component with view order index equal to i. The value of the ref_view_idx_diff_minus1[i][j] element may be in the range of 0 to 30−i, inclusive.

Other examples are also possible. For example, rather than signaling view dependency in an SPS (such as the examples shown in Tables 6 and 7 above), view dependency may be signaled in a PPS. In another example, the view dependency may be signaled in the SPS, and a view dependency may be further signaled in a PPS that is inside the scope of the view dependency signaled in the sequence parameter set. For example, in an SPS, a dependent view (e.g., view 2) may be signaled as being dependent on view 0 and view 1, while in a PPS, the dependent view (e.g., view 2) may be signaled as only being dependent on view 0.

While the relationship between the view order index and view ids may require some associated signaling, e.g., in an SPS, NAL unit headers typically consume many more bits than such signaling. Accordingly, by reducing the size of the NAL unit headers, these techniques may achieve a bit savings over the MVC/AVC scheme. The information indicative of the relationship may comprise, for example a mapping table that maps view_id values to view order index values. In this manner, video decoder 30 may simply receive a view order index value in a NAL unit header and determine the view_id of the NAL unit using the mapping table.

Furthermore, the view order index may have a dynamic length. For example, in HEVC, the view order index length may depend on whether it is a base view, a profile, or a number of views supported in the multi-view video coding bitstream. For example, an additional bit savings may be achieved in a multi-view video coding stream that includes only two views (that is, for stereo video). In this example, a view order index may not be needed, as video decoder 30 may always decode a first view (e.g., view 0) prior to decoding a second view (e.g., view 1). That is, according to some examples, a base view may be assigned with a default view order index of 0, and therefore does not need to be signaled.

In addition, a prefix NAL unit, which is included immediately prior to NAL units of a base view (e.g., view 0) of an MVC/AVC base view, may no longer be required when using the view order index described above. For example, video decoder 30 may no longer require a prefix NAL unit for a base view, because a view order index may always be zero for the base view, and a temporal position of the base view may be determined using the temporal_id (included in MCV/AVC). Accordingly, video encoder 20 may signal the temporal_id in a NAL unit header, which may provide all of the information needed for video decoder 30 to associate a particular view component with a particular view and with an appropriate temporal location.

With respect to the emerging HEVC standard, in some examples, when a prefix NAL unit is not used for the HEVC compliant base view, a flag may be added into the NAL unit header of the HEVC base view. The flag may only be used to indicate whether the view component (of that particular NAL unit) may be used to inter-predict view components of other views of the bitstream.

In addition, according to some examples, the view order index can be used with a picture order count (POC) value (e.g., which indicates a display order of the pictures) or a frame value (e.g., which indicates a decoding order of the pictures) to identify a view component of a bitstream.

As another example, as noted above, the MVC/AVC SPS may indicate dependent views (i.e., views referred to by one or more other views for purposes of prediction) separately for each view. For example, an anchor_pic_flag included in an MVC/AVC NAL unit header may be used to indicate whether the NAL unit belongs to an anchor picture that can be used as an open-GOP random access point. In MVC/AVC, as described above, view dependency is signaled differently for anchor pictures and non-anchor pictures. Accordingly, for the dependent views signaled for each view, four different categories are considered, each of which is differentiated by whether a picture is for an anchor picture or whether a picture is for List 0 or List 1. Such a design not only requires a relatively large number of bits to maintain such demarcations, but also may complicate reference picture list construction (e.g., each category must be maintained during reference list construction and reordering).

According to some examples, video encoder 20 may signal (and video decoder 30 may receive such signaling) view dependency for each view of a multi-view video coding bitstream commonly for all view components, regardless of whether the view components are for anchor pictures and non-anchor pictures. In some examples, the SPS includes an indication of view dependencies for the view components, rather than relying on information in a NAL unit header. In this manner, video encoder 20 and video decoder 30 may not use the anchor_pic_flag used in the MVC/AVC NAL unit header. In examples applicable to scalable video coding, video encoder 20 may signal (and video decoder 30 may receive such signaling) scalable layer dependency for each scalable layer of a scalable video coding bitstream commonly for all scalable layers, regardless of whether the scalable layers are for anchor pictures and non-anchor pictures.

A view component of a signaled dependent view may be used as a reference picture in both List 0 and List 1. In addition, reference picture list construction and reference picture list reordering for List 0 and List 1 may also be based on common signaling for anchor pictures and non-anchor pictures. In some examples, a sequence level, supplemental enhancement information (SEI) message maybe used to indicate when a non-anchor picture has a different view dependency than an anchor picture.

Accordingly, certain aspects of this disclosure relate to removing the anchor picture/non-anchor picture and List 0/List 1 signaling distinction of the MVC/AVC, thereby simplifying the bitstream, as well as construction of a reference picture list. For example, according to aspects of this disclosure, video decoder 30 may receive, for any view component a first view, reference view information indicating one or more reference views for predicting view components of the first view. That is, video decoder 30 may receive reference view information indicating view dependencies for anchor pictures of a view and non-anchor pictures of a view alike. The reference view information may include, for example, a view order index (indicating a decoding order of the view in an access unit) associated with each reference view, as described above.

In addition, when decoding a particular picture (of an access unit) of a particular view, video decoder 30 may include reference candidates (e.g., view components from which the particular picture can be predicted from) from the same access unit as the particular picture and from the reference views indicated by the reference view information. In some instances, video decoder 30 may add reference candidates to the reference picture list from each reference view, such that the number of reference candidates is equal to the number of reference views. In addition, video decoder 30 may add reference candidates to either List 1, List 0, or both. Video decoder 30 may then decode the particular picture based on one of the reference pictures in the reference picture list.

As still another example, as described above, a priority_id is included in the NAL unit header of an MVC/AVC compliant bitstream. The priority_id provides an indication of the priority of a particular NAL unit. More particularly, each NAL unit is conventionally assigned a priority value. In response to a request for priority value P, all NAL units having priority values less than or equal to P will be provided (that is, NAL units having priority_id values greater than P are discarded). In this manner, lower priority values specify higher priorities. It should be understood that NAL units of the same view may have different priorities, e.g., for temporal scalability within the view.

This priority may be used for purposes of scalability. For example, to retrieve video data consuming the least amount of bandwidth (at the cost of forming a relatively low quality representation), video decoder 30 (or, more generally, destination device 14) may request only the highest priority NAL units to be transmitted from a source such as source device 12/video encoder 20, and the priority_id can be used to filter out lower priority NAL units. In some examples, router 36 of server/content delivery network 34 may use the priority_id to separate relatively high priority NAL units from lower priority NAL units. To produce a relatively higher quality representation (at the cost of higher bandwidth consumption), video decoder 30 may request NAL units having a lower priority to supplement the higher priority NAL units, e.g., by specifying a higher priority value.

According to some examples, rather than signaling the priority_id in the NAL unit header, video encoder 20 may provide priority_id values in an SPS. That is, a priority_id for each view with a certain temporal level may be signaled in the sequence level. In addition, according to some examples, single pass adaption may be enabled as long as the signaling context associated with the adaptation is known.

As discussed above, in some examples, router 36, which may be responsible for forwarding the bitstream to destination device 14, may use the SPS priority_id values to filter certain views. That is, router 36 may receive the full bitstream, but extract a sub-bitstream including NAL units having priority_id values at and below a priority value specified by destination device 14, and forward the sub-bitstream to destination device 14.

In still another example, according to MVC/AVC, single-pass adaptation requires a 6-bit priority_id in the NAL unit header. For example, as noted above, an MVC/AVC SPS may include a view level indication for view scalability. That is, each view of an MVC bitstream may coded in a hierarchical manner and be assigned a numerical view level.

According to some examples, an SPS may include the view level information. Thus, when destination device 14 requests views of view level V from server/content delivery network 34, destination device 14 receives all views having view levels less than or equal to V. Similar to the use of priority_id values described above, router 36 of server/content delivery network 34 may use the view levels to extract a sub-bitstream including data for views having view levels less than or equal to a client-requested view level.

As another example efficiency gain in relation to MVC/AVC, according to some aspects of the present disclosure, a video coding technique, such as the MVC/AVC implementation or a different video coding technique implementing the above described differences from MVC/AVC, such as the forthcoming HEVC standard, may include signaling view dependencies associated with a given view and signaling a type of prediction associated with one or more of the view dependencies.

It may be less efficient to include views for inter-view prediction in a reference picture set (RPS) subset that are only used for one type of prediction. In a more general sense, it may be less efficient to include dependent views for inter-view prediction in an inter-view RPS subset that are associated with relatively less types of inter-view prediction than other dependent views. For example, for a given view A, view B may only be used as an inter-view texture prediction reference. Alternatively, view B may only be used as an inter-view motion prediction reference. However, including view B in an inter-view RPS subset for decoding view A is not as efficient as only including views that may be used for both inter-view texture prediction and for inter-view motion prediciton. This concept may be extended beyond just inter-view texture and inter-view motion prediction, such as inter-view residual prediction. For example, generally, it will be less efficient to include views that are only used for limited numbers of types of prediction as opposed to those that are used for relatively more types of predictions.

Accordingly, according to some aspects of this disclosure, new syntax elements may be added as part of the SPS syntax that indicate not only whether the dependent view is included in the inter-view RPS subset for a given view, but also the type(s) of prediction associated with the dependent view. For instance, num_ref views[I], ref_view_idx[I][j], and inter_view_texture_flag[I][j] syntax elements may be added to the SPS set. Inter_view_texture_flag[I][j] may indicate whether a j-th dependent view for a given view I may be used in inter-view texture prediction, and therefore is to be included in the inter-view RPS subset for view i. The following syntax structure of Table 5 represents on example of the additional syntax elements:

TABLE 5

| | |
|---|---|
| for( i = 1; i <= num__views__minus1; i++ ) { | |
|   num__ref__views[ i ] | ue(v) |
|   for( j = 0; j < num__ref__views[ i ]; j++ ) | |
|   { | |
|     ref__view__idx[ i ][ j ] | ue(v) |
|     inter__view__texture__flag[ i ][ j ] | u(1) |
|   } | |
| } | |

In Table 5 above, the num_views_minus1 plus 1 element may specify the maximum number of coded views in the coded video sequence. In some examples, the value of num_view_minus1 may range from 0 to 31, inclusive. In addition, the num_ref_views [i] may specify the number of dependent views to be used to decode the view with view_id equal view_id[i] (or with view index equal to i). The value of num_ref_views[i] shall not be greater than Min(15, num_views_minus1). The value of num_ref_views[0] shall be equal to 0. Further, ref_view_idx[i][j] may specify the view index of the j-th dependent view when decoding a view component with view index equal to i. The value of ref_view_idx[i][j] shall be in the range of 0 to 31, inclusive.

When the inter_view_texture_flag[i][j] element is equal to 1, inter_view_texture_flag[i][j] may specify that the view component with view order index equal to ref_view_idx[i][j] is to be included in the inter-view RPS subset to be used for reference picture list construction of the view components with view index equal to i. For example, inter_view_texture_flag[i][j] may be set equal to 1 when the view component with view order index equal to ref_view_idx[i][j] may used in inter-view texture prediction of the view components with the view index equal to i. When inter_view_texture_flag[i][j] is equal to 0, inter_view_texture_flag[i][j] may specify that the view component with view order index equal to ref_view_idx[i][j] is not included in the inter-view RPS subset to be used for reference picture list construction. For example, inter_view_texture_flag[i][j] may be set equal to 0 when the view component with view order index equal to ref_view_idx[i][j] may not used in inter-view texture prediction of the view components with the view index equal to i. In other examples, inter_view_texture_flag[i][j] may be set equal to 1 only when the view component with view order index equal to ref_view_idx[i][j] may used in inter-view texture prediction and another type of inter-view prediction, such as inter-view motion or inter-view texture prediction.

The view components added into the inter-view RPS subset for the decoding of a view component with view index equal to i, are in the ascending order of j. In this manner, inter_view_texture_flag [i][j] may indicate whether a view component with view order index equal to ref_view_idx[i][j] can or cannot be used for inter-view texture prediction for view components with a view index equal to i.

In the above description, view index can be equivalently denoted as view order index. Alternatively the view index used in the above signaling can be replaced by layer_id, when the decoding of a view with layer_id LD doesn't depend on views with layer_id values higher than LD.

The above described elements may be applicable to scalable coding techniques as well. For example, although the elements may be differently named, an element similar to inter_view_texture_flag [i][j] may specify whether the scalable layer with layer order index equal to ref_view_idx[i][j] is to be included in the inter-layer RPS subset to be used for reference picture list construction of the scalable layer with layer index equal to i. The inter_view_texture_flag[i][j] or similar element may be set equal to 1 when the scalable layer with layer order index equal to ref_view_idx[i][j] may used in inter-layer texture prediction of the scalable layer with layer index equal to i. When inter_view_texture_flag[i][j] is equal to 0, inter_view_texture_flag[i][j] may specify that the scalable layer with layer order index equal to ref_view_idx[i][j] is not included in the inter-layer RPS subset to be used for reference picture list construction. For example, inter_view_texture_flag[i][j] may be set equal to 0 when the scalable layer with layer order index equal to ref_view_idx[i][j] may not used in inter-layer texture prediction of the scalable layer with layer index equal to i.

According to some aspects of the present disclosure, an indication may be signaled for each inter-view reference. The indication may represent both whether the specific inter-view reference is to be included in an inter-view RPS subset and whether the specific inter-view reference is used for other types of inter-view prediction, such as inter-view motion prediction and inter-view residual prediction. The following Table 6 provides an example of an indication, inter_view_texture_idc[I][j].

TABLE 6

```
for( i = 1; i <= num_views_minus1; i++ ) {
    num_ref_views[ i ]                              ue(v)
    for( j = 0; j < num_ref_views[ i ]; j++ )
    {
        ref_view_idx[ i ][ j ]                      ue(v)
        inter_view_texture_idc[ i ][ j ]            u(2)
    }
}
```

For example, if inter_view_texture_idc[i][j] of Table 6 is set equal to 0, inter_view_texture_idc[i][j] may specify that the view component (i.e. the reference view component) with view order index equal to ref_view_idx[i][j] is not included in the inter-view RPS subset to be used for reference picture list construction of the view components with view index equal to i. In at least one example, inter_view_texture_idc[i][j] may be set equal to 0 when the reference view component with view order index equal to ref_view_idx[i][j] is not used in inter-view texture prediction or other types of inter-view prediciton, for example inter-view motion prediction or inter-view residual prediction, for a given view i. In some examples, inter_view_texture_idc[i][j] may be set equal to 0 when the reference view component with view order index equal to ref_view_idx[i][j] is not used in inter-view texture prediction and is used in only a single other type of inter-view prediction (i.e. only inter-view motion prediction or inter-view residual prediction, but not both).

In application to scalable video coding, if inter_view_texture_idc[i][j] of Table 6 is set equal to 0, inter_view_texture_idc[i][j] may specify that the scalable layer with layer order index equal to ref_view_idx[i][j] is not included in the inter-layer RPS subset to be used for reference picture list construction of the scalable layer with layer index equal to i. In at least one example, inter_view_texture_idc[i][j] may be set equal to 0 when the reference scalable layer with layer order index equal to ref_view_idx[i][j] is not used in inter-layer texture prediction or other types of inter-layer prediciton, for example inter-layer motion prediction or inter-layer residual prediction, for a given layer i. In some examples, inter_view_texture_idc[i][j] may be set equal to 0 when the reference scalable layer with layer order index equal to ref_view_idx[i][j] is not used in inter-layer texture prediction and is used in only a single other type of inter-layer prediction (i.e. only inter-layer motion prediction or inter-layer residual prediction, but not both).

If inter_view_texture_idc[i][j] is set equal to 1, inter_view_texture_idc[i][j] may specify that the view component with view order index equal to ref_view_idx[i][j] is to be included in the inter-view RPS subset to be used for reference picture list construction of the view components with view index equal to i. In at least one example, inter_view_texture_idc[i][j] may be set equal to 1 when the reference view component with view order index equal to ref_view_idx[i][j] is used in inter-view texture prediction for a given view i, but not for other types of inter-view prediction, for example inter-view motion prediction or inter-view residual prediction, for given view i. In some examples, inter_view_texture_idc[i][j] may only be set equal to 1 when the reference view component with view order index equal to ref_view_idx[i][j] is used in inter-view texture prediction and is used in only a single other type of inter-view prediction (i.e. only inter-view motion prediction or inter-view residual prediction, but not both).

In application to scalable video coding, if inter_view_texture_idc[i][j] is set equal to 1, inter_view_texture_idc[i][j] may specify that the scalable layer with layer order index equal to ref_view_idx[i][j] is to be included in the inter-layer RPS subset to be used for reference picture list construction of the layer with layer index equal to i. In at least one example, inter_view_texture_idc[i][j] may be set equal to 1 when the reference scalable layer with layer order index equal to ref_view_idx[i][j] is used in inter-layer texture prediction for a given view i, but not for other types of inter-layer prediction, for example inter-layer motion prediction or inter-layer residual prediction, for given layer i. In some examples, inter_view_texture_idc[i][j] may only be set equal to 1 when the reference scalable layer with layer order index equal to ref_view_idx[i][j] is used in inter-layer texture prediction and is used in only a single other type of inter-layer prediction (i.e. only inter-layer motion prediction or inter-layer residual prediction, but not both).

If inter_view_texture_idc[i][j] is set equal to 2, inter_view_texture_idc[i][j] may specify that the view component with view order index equal to ref_view_idx[i][j] is not to be included in the inter-view RPS subset to be used for reference picture list construction of the view components with view index equal to i. In at least one example, inter_view_texture_idc[i][j] may be set equal to 2 when the reference view component with view order index equal to ref_view_idx[i][j] is not used in inter-view texture prediction, but is used in other types of inter-view prediciton for a given view i. In some examples, inter_view_texture_idc[i][j] may be set equal to 2 when the reference view component with view order index equal to ref_view_idx[i][j] is not used in inter-view texture prediction and is used in at least one other type of inter-view prediction (i.e. one of inter-view motion prediction or inter-view residual prediction). In other examples, inter_view_texture_idc[i][j] may be set equal to 2 only when the reference view component with view order index equal to ref_view_idx[i][j] is not used in inter-view texture prediction and is used in at least two other type of inter-view prediction (i.e. both inter-view motion prediction and inter-view residual prediction).

In application to scalable video coding, if inter_view_texture_idc[i][j] is set equal to 2, inter_view_texture_idc[i][j] may specify that the scalable layer with layer order index equal to ref_view_idx[i][j] is not to be included in the inter-layer RPS subset to be used for reference picture list construction of the view components with layer index equal to i. In at least one example, inter_view_texture_idc[i][j] may be set equal to 2 when the reference scalable layer with layer order index equal to ref_view_idx[i][j] is not used in inter-layer texture prediction, but is used in other types of inter-layer prediciton for a given layer i. In some examples, inter_view_texture_idc[i][j] may be set equal to 2 when the reference scalable layer with layer order index equal to ref_view_idx[i][j] is not used in inter-layer texture prediction and is used in at least one other type of inter-layer prediction (i.e. one of inter-layer motion prediction or inter-layer residual prediction). In other examples, inter_view_texture_idc[i][j] may be set equal to 2 only when the reference scalable layer component with layer order index equal to ref_view_idx[i][j] is not used in inter-layer texture prediction and is used in at least two other type of inter-layer prediction (i.e. both inter-layer motion prediction and inter-layer residual prediction).

If inter_view_texture_idc[i][j] is set equal to 3, inter_view_texture_idc[i][j] may specify that the view component with view order index equal to ref_view_idx[i][j] is to be included in the inter-view RPS subset to be used for reference picture list construction of the view components with view index equal to i. In at least one example, inter_view_texture_idc[i][j] may be set equal to 3 when the reference view component with view order index equal to ref_view_idx[i][j] is used in both inter-view texture prediction and other types of inter-view prediciton for a given view i. In some examples, inter_view_texture_idc[i][j] may only be set equal to 3 when the reference view component with view order index equal to ref_view_idx[i][j] is used in inter-view texture prediction and is used in at least one other type of inter-view prediction (i.e. one of inter-view motion prediction or inter-view residual prediction). In other examples, inter_view_texture_idc[i][j] may only be set equal to 3 when the reference view component with view order index equal to ref_view_idx[i][j] is used in inter-view texture prediction and is used in at least two other type of inter-view prediction (i.e. both inter-view motion prediction and inter-view residual prediction).

In application to scalable video coding, if inter_view_texture_idc[i][j] is set equal to 3, inter_view_texture_idc[i][j] may specify that the scalable layer with layer order index equal to ref_view_idx[i][j] is to be included in the inter-layer RPS subset to be used for reference picture list construction of the layer with layer index equal to i. In at least one example, inter_view_texture_idc[i][j] may be set equal to 3 when the reference scalable layer with layer order index equal to ref_view_idx[i][j] is used in both inter-layer texture prediction and other types of inter-layer prediciton for a given layer i. In some examples, inter_view_texture_idc[i][j] may only be set equal to 3 when the reference scalable layer with layer order index equal to ref_view_idx[i][j] is used in inter-layer texture prediction and is used in at least one other type of inter-layer prediction (i.e. one of inter-layer motion prediction or inter-layer residual prediction). In other examples, inter_view_texture_idc[i][j] may only be set equal to 3 when the reference scalable layer with layer order index equal to ref_view_idx[i][j] is used in inter-layer texture prediction and is used in at least two other type of inter-layer prediction (i.e. both inter-layer motion prediction and inter-layer residual prediction).

Additionally, according to some aspects of the present disclosure, if inter_view_texture_idc[i][j] is equal to 1 or 3, inter_view_texture_flag[i][j] may be derived to be equal to 1, otherwise inter_view_texture_flag[i][j] may be derived to be equal to 0. This is likewise applicable to the scalable video coding application.

According to some aspects of the present disclosure, another syntax element may be introduced: InterViewOtherFlag[i][j]. Continuing the above example, in some instances, one or more dependent views with view order index equal to ref_view_idx[i][j] for a given view i may be used in inter-view prediction types other than inter-view texture prediction. For example, the j-th view of ref_view_idx[i][j] for a given view i may be used in inter-view motion prediction or inter-view residual prediction. When the j-th view of ref_view_idx[i][j] for a given view i is not used in inter-view prediction other than inter-view texture prediction, for example, when inter_view_texture_idc[i][j] is set equal to either 0 or 1, InterViewOtherFlag[i][j] may be derived to be equal to 0. Accordingly, when InterViewOtherFlag[i][j] is equal to 0, InterViewOtherFlag[i][j] may indicate that a particular view component with view order index equal to ref_view_idx[i][j] may not be used in other types of inter-view prediction, for example inter-view motion prediction or inter-view residual prediction, for a given view i.

When the j-th view of ref_view_idx[i][j] for a given view i is used in inter-view prediction other than inter-view texture prediction, for example, when inter_view_texture_idc[i][j] is set equal to either 2 or 3, InterViewOtherFlag[i][j] may be derived to be equal to 1. Accordingly, when InterViewOtherFlag[i][j] is equal to 1, InterViewOtherFlag [i][j] may indicate that a particular view component with view order index equal to ref_view_idx[i][j] may be used in other types of inter-view prediction, for example inter-view motion prediction or inter-view residual prediction, for a given view i. In some examples, InterViewOtherFlag[i][j] may be derived to be equal to 1 only when the view component with view order index equal to ref_view_idx[i] [j] may be used in more than a single other type of inter-view prediction, for example both inter-view motion prediction and inter-view residual prediction.

Similar to the above referenced inter_view_texture_flag [i][j] and inter_view_texture_idc [i][j] elements, the InterViewOtherFlag[i][j] may be adapted to be applicable in a scalable video coding scheme.

According to some aspects of the present disclosure, video coder 20 may construct one or more reference picture sets comprising reference pictures (which may include reference views) used in various prediction processes for predicting data for a current picture. In some examples, video encoder 20 may construct an inter-view reference picture set (RefPicSetInterView) according to a method described in U.S. patent application Ser. No. 13/720,622, titled "REFERENCE LIST CONSTRUCTION FOR MULTIVIEW AND 3D EXTENSIONS OF HEVC," filed on Dec. 19, 2012, which is incorporated by reference herein in its entirety.

Accordingly, some reference pictures are "short-term" reference pictures and some reference pictures are "long-term" reference pictures. Long-term reference pictures may remain in the reference picture lists for longer periods of time than short-term reference pictures. If video encoder 20 determines that it would be advantageous to maintain the availability of a reference picture for an extended period of time (e.g., several seconds), video encoder 20 may signal that the reference picture is a long-term reference picture. For instance, video encoder 20 may indicate that a reference frame is a long-term reference picture if the reference picture contains a static background and other pictures cover and uncover portions of this static background. In H.264/AVC or H.264/MVC/AVC, a short-term reference picture never has a frame number (frame_num) equal to the frame number of the current picture (i.e., the picture that is currently being coded). A frame number of a picture is a value based on a picture number of the picture. The frame number of a picture may be used to identify the picture when the picture is used as a short-term reference picture.

As mentioned above, video coders (e.g., video encoder 20 and video decoder 30) may maintain a first reference picture list (list 0) and a second reference picture list (list 1). List 0 and list 1 may be lists of frame numbers of reference pictures. Video encoder 20 may signal that a video block is inter-predicted using a reference block in a particular reference picture by signaling a position in a reference picture list of the frame numbers of the particular reference picture.

Some video coders generate reference picture lists such that the frame numbers of temporal (i.e., intra-view) reference pictures are always initially listed first. The frame numbers of the temporal reference pictures are followed in the reference picture lists by the frame numbers of inter-view reference pictures. That is, a video coder may generate a reference picture using the following steps. First, the video coder may apply a reference picture list initialization process for temporal (i.e., intra-view) reference pictures as specified in the H.264/AVC standard, wherein reference pictures from other views are not considered. Second, the video coder may append inter-view reference pictures to the end of the reference picture list in an order that the inter-view reference pictures occur in the multi-view video coding SPS extension. Third, the video coder may apply a reference picture list modification (RPLM) process for both intra-view and inter-view reference pictures. For instance, a video encoder or a video decoder may perform a reference picture list modification process that changes a position in a reference picture list of an inter-view reference view component. Inter-view reference pictures may be identified in RPLM commands by their index values, as specified by the multi-view video coding SPS extension. The RPLM process is described in detail below.

In HEVC, a NAL unit header of a VCL NAL unit may be two bytes in length. In contrast, a NAL unit header of a VCL NAL unit in H.264/AVC may only be one byte in length. The first byte of the NAL unit header of a HEVC VCL NAL unit may have the same syntax and semantics as the NAL unit header of a H.264/AVC VCL NAL unit. When the second byte of the NAL unit header of a HEVC VCL NAL unit is present, the second byte of the NAL unit header of the HEVC VCL NAL unit may include a temporal identifier (e.g., "temporal_id") syntax element and an output flag (e.g., "output_flag") syntax element. The temporal identifier syntax element may specify a temporal identifier for the NAL unit. Each NAL unit that includes a coded slice of a view component of an access unit may have the same the temporal identifier. The output flag syntax element may affect output of a decoded picture associated with the NAL unit, as described in Annex C of HEVC.

Furthermore, after a video coder generates reference picture lists 0 and 1 in HEVC, the video coder may generate a combined reference picture list from reference pictures in reference picture lists 0 and 1. To generate the combined reference picture list, the video coder may select entries (i.e., reference pictures) from lists 0 and 1 and inserts (e.g., appends) the selected entries to the combined reference picture list. In some examples, the video coder may select the entries from list 0 and list 1 based on ascending order of occurrence in list 0 and list 1. If a selected entry is already in the combined reference picture list, the video coder does not insert the entry into the combined reference picture list again. The video coder may determine whether a selected entry is already in the combined reference picture list by checking picture order count (POC) numbers of the entries.

In HEVC, video encoder 20 signals a Reference Picture Set (RPS) for each coded picture. An RPS of a coded picture is set of reference pictures associated with the coded picture. The RPS may include, and in some examples consist of, all reference pictures that are prior to the coded picture in decoding order that may be used for inter prediction of the coded picture or any picture following the coded picture in decoding order.

Video encoder 20 may signal the RPS's of coded pictures in PPS's and slice headers. For instance, video encoder 20 may signal an RPS in a PPS and may signal in a slice header of a coded picture that the RPS of the coded picture is the RPS signaled in the PPS. In other instances, video encoder 20 may signal the RPS of a coded picture directly in a slice header of the coded picture. Accordingly, video decoder 30 may parse, from a slice header, the syntax elements indicating the RPS.

The RPS of a view component (i.e., the current view component) may be divided into five reference picture subsets: RefPicSetStCurr0, RefPicSetStCurr1, RefPicSetStFoll0, RefPicSetStFoll1, RefPicSetLtCurr, and RefPicSetLtFoll. Each of these reference picture subsets may comprise a list of POC values that identify reference view components. The terms "reference view components" and "reference pictures" may be used interchangeably in this disclosure. RefPicSetStCurr0 may consist of all short-term reference view components that are prior to the current view component in both decoding order and output order, and that may be used in inter prediction of the current view component. RefPicSetStCurr1 may consist of all short-term reference view components that are prior to the current view component in decoding order, that succeed the current view component in output order, and that may be used in inter prediction of the current view component. RefPicSetStFoll0 may consist of all short-term reference view components that are prior to the current view component in both decoding order and output order, that may be used in inter prediction of one or more of the view components following the current view component in decoding order, and that are not used in inter prediction of the current view component. RefPicSetStFoll1 may consist of all short-term reference view components that are prior to the current view component in decoding order, that succeed the current view component in output order, that may be used in inter prediction of one or more of the view component following the current view component in decoding order, and that are not used in inter prediction of the current view component. RefPicSetLtCurr may consist of all long-term reference view components that are prior to the current view component in decoding order and that may be used in inter prediction of the current view component. RefPicSetLtFoll may consist of all long-term reference view components that are prior to the current view component in decoding order, that may be used in inter prediction of one or more of view components following the current view component in decoding order, and that are not used in inter prediction of the current view component.

The number of entries in RefPicSetStCurr0, RefPicSetStCurr1, RefPicSetStFoll0, RefPicSetStFoll1, RefPicSetLtCurr, and RefPicSetLtFoll may be referred to in this disclosure as NumRpsStCurr0, NumRpsStCurr1, NumRpsStFoll0, NumRpsStFoll1, NumRpsLtCurr, and NumRpsLtFoll respectively. If the current view component is an IDR picture, RefPicSetStCurr0, RefPicSetStCurr1, RefPicSetStFoll0, RefPicSetStFoll1, RefPicSetLtCurr, and RefPicSetLtFoll are all empty, and NumRpsStCurr0, NumRpsStCurr1, NumRpsStFoll0, NumRpsStFoll1, NumRpsLtCurr, and NumRpsLtFoll are all equal to 0. Further description of reference pictures sets may be found in Boyce et al., "JCT-VC break-out report: Reference picture buffering and list construction (AHG21), document no. JCTVC-G1002, dated Nov. 11, 2011, which as of Apr. 22, 2013 is available from http://phenix.int-evry.fr/jct/doc_end_user/documents/7_Geneva/wg11/JCTVC-G1002-v5.zip, the entire content of which is incorporated herein by reference.

When a video coder codes a P or B slice, the video coder may generate initial versions of list 0 and list 1. In other words, the video coder may initialize list 0 and list 1. The video coder may generate the initial versions of list 0 and list 1 such that list 0 and list 1 include at least one reference picture from RefPicSetCurr0, RefPicSetCurr1, or RefPicSetLtCurr.

For instance, the video coder may perform an operation described by the following pseudo-code to generate the initial version of list 0.

```
cIdx = 0
while( cIdx <= num_ref_idx_l0_active_minus1 )
{
    for( i=0; i < NumRpsStCurr0 && cIdx <=
    num_ref_idx_l0_active_minus1; cIdx++, i++ )
        RefPicList0[ cIdx ] = RefPicSetStCurr0[ i ]
    for( i=0; i < NumRpsStCurr1 && cIdx <=
    num_ref_idx_l0_active_minus1; cIdx++, i++ )
        RefPicList0[ cIdx ] = RefPicSetStCurr1[ i ]
    for( i=0; i < NumRpsLtCurr && cIdx <=
    num_ref_idx_l0_active_minus1; cIdx++, i++)
        RefPicList0[ cIdx ] = RefPicSetLtCurr[ i ]
}
```

In the pseudo-code above, cIdx is a counter variable. Furthermore, in the pseudo-code above, num_ref_idx_l0_active_minus1 is a value that indicates the number of active reference pictures in list 0, minus 1. When the video coder performs the pseudo-code above, the video coder inserts each reference picture of RefPicSetStCurr0 into reference picture list 0, then inserts each reference picture of RefPicSetStCurr1 into reference picture list 0, then inserts each reference picture of RefPicSetLtCurr into reference picture list 0.

The video coder may perform an operation described by the following pseudo-code to generate the initial version of list 1.

```
cIdx = 0
while( cIdx <= num_ref_idx_l1_active_minus1 )
{
    for( i=0; i < NumRpsStCurr1 && cIdx <=
    num_ref_idx_l1_active_minus1; cIdx++, i++ )
        RefPicList1[ cIdx ] = RefPicSetStCurr1[ i ]
    for( i=0; i < NumRpsStCurr0 && cIdx <=
    num_ref_idx_l1_active_minus1; cIdx++, i++ )
        RefPicList1[ cIdx ] = RefPicSetStCurr0[ i ]
    for( i=0; i < NumRpsLtCurr && cIdx <=
    num_ref_idx_l1_active_minus1; cIdx++, i++)
        RefPicList1[ cIdx ] = RefPicSetLtCurr[ i ]
}
```

When the video coder performs the pseudo-code above, the video coder inserts each reference picture of RefPicSetStCurr0 into reference picture list 1, then inserts each reference picture of RefPicSetStCurr1 into reference picture list 1, then inserts each reference picture of RefPicSetLtCurr into reference picture list 1.

In some instances, it may be advantageous to change the order of reference pictures in a reference picture list. For instance, because positions may be signaled using unary values, fewer bits may be required to indicate the first position in a reference picture list than a last position in the reference picture list. Hence, if a particular reference picture is likely to be used frequently, it may be advantageous to have the particular reference picture closer to the first position of the reference picture list than to the last position in the reference picture list.

Accordingly, video encoder 20 may include a series of one or more RPLM commands in the bitstream. An RPLM command may be a set of one or more syntax elements for inserting a reference picture in a reference picture list. Thus, by including RPLM commands in the bitstream, video encoder 20 may flexibly arrange temporal and view prediction references, which may provide potential coding efficiency gains. In addition, the use of RPLM commands may increase error resilience because reference picture selection and redundant picture mechanisms may be extended to the view dimension.

Video decoder 30 processes the RPLM commands in the order the RPLM commands are signaled in the bitstream. Furthermore, when video decoder 30 processes a series of RPLM commands, video decoder 30 may initially set a current index value to 0 and may increment the current index value during processing of each RPLM command. When video decoder 30 processes a RPLM command, video decoder 30 may shift down in the reference picture list, by one position, the reference picture at the position indicated by the current index value and all reference pictures at positions following the position indicated by the current index value. Video decoder 30 may then insert a reference picture into the reference picture list at the position indicated by the current index value. Video decoder 30 may then scan through the reference picture list and remove, if present, a duplicate of the inserted reference picture.

RPLM commands may be specified in a slice header of a coded slice. Table 3, below, shows an example syntax for RPLM commands that may be included in a slice header.

TABLE 7

RPLM syntax

| ref_pic_list_modification( ) { | Descriptor |
|---|---|
| if( slice_type!= 2 ) { | |
|   ref_pic_list_modification_flag_l0 | u(1) |
|   if( ref_pic_list_modification_flag_l0 ) | |
|     do { | |
|       list_modification_idc | ue(v) |
|       if( list_modification_idc != 3 ) | |
|         ref_pic_set_idx | ue(v) |
|     } while( list_modification_idc != 3) | |
| } | |
| if( slice_type % 5 == 1 ) { | |
|   ref_pic_list_modification_flag_l1 | u(1) |
|   if( ref_pic_list_modification_flag_l1 ) | |
|     do { | |
|       list_modification_idc | ue(v) |
|       if( list_modification_idc != 3 ) | |
|         ref_pic_set_idx | ue(v) |
|     } while( list_modification_idc != 3) | |
| } | |
| } | |

In Table 7, "slice_type" indicates a type of the current slice (i.e., the slice whose slice header includes the RPLM commands). Table 8, below, indicates example semantics of "slice_type."

TABLE 8

| slice_type | Name of slice_type |
|---|---|
| 0 | P (P slice) |
| 1 | B (B slice) |
| 2 | I (I slice) |

Furthermore, in the example syntax of Table 8, the "list_modification_idc" and "ref_pic_set_idx" syntax elements may specify changes from the initial versions of the reference picture lists to the versions of the reference picture lists that a video coder uses for inter prediction. The "ref_pic_list_modification_flag_l0" syntax element indicates whether there are one or more "list_modification_idc" syntax elements to modify list 0. When the "ref_pic_list_modification_flag_l0" syntax element is equal to 1, the number of times that the "list_modification_idc" syntax element is not equal to 3 may not exceed the number of active reference picture lists in list 0. The "ref_pic_list_modification_flag_l1" syntax element indicates whether there are one or more "list_modification_idc" syntax elements to modify list 1. When "ref_pic_list_modification_flag_l1" is equal to 1, the number of times that list_modification_idc is not equal to 3 may not exceed the number of active reference picture lists in list 1.

In general, the "ref_pic_set_idx" syntax element specifies an index to a position in RefPicSetStCurr0, RefPicSetStCurr1 or RefPicSetLtCurr of a reference picture to be moved to the current index in the reference picture list. The value of the "ref_pic_set_idx" syntax element may range from 0 to the maximum-allowable number of reference pictures, inclusive.

The "list_modification_idc" syntax element specifies a type of RPLM command to perform. For ease of explanation, this syntax element may be referred to as the RPLM type syntax element. In some examples, the RPLM type syntax element may have a value ranging from 0 to 3, inclusive, as illustrated by the table below.

TABLE 9

| list_modification_idc | modification specified |
|---|---|
| 0 | For list 0: ref_pic_set_idx is present and corresponds to an index to RefPicSetStCurr0; For list 1: ref_pic_set_idx is present and corresponds to an index to RefPicSetStCurr1 |
| 1 | For list 0: ref_pic_set_idx is present and corresponds to an index to RefPicSetStCurr1; For list 1: ref_pic_set_idx is present and corresponds to an index to RefPicSetStCurr0 |
| 2 | ref_pic_set_idx is present and corresponds to an index to RefPicSetLtCurr |
| 3 | End loop for modification of the initial reference picture list |

For list 0, if the RPLM type syntax element is equal to 0, the "ref_pic_set_idx" syntax element is present and the "ref_pic_set_idx" syntax element corresponds to an index to a position in RefPicSetStCurr0. For example, "ref_pic_set_idx" may indicate the reference picture at the second position in RefPicSetStCurr0. For list 1, if the RPLM type syntax element is equal to 0, the "ref_pic_set_idx" syntax element is present and the "ref_pic_set_idx" syntax element corresponds to an index to a position in RefPicSetStCurr1.

For list 0, if the RPLM type syntax element is equal to 1, the "ref_pic_set_idx" syntax element is present and the "ref_pic_set_idx" syntax element corresponds to an index to a position in RefPicSetStCurr1. For list 1, if the RPLM type syntax element is equal to 1, the "ref_pic_set_idx" syntax element is present and the "ref_pic_set_idx" syntax element corresponds to an index to a position in RefPicSetStCurr0.

If the RPLM type syntax element is equal to 2, the "ref_pic_set_idx" syntax element is present and the "ref_pic_set_idx" syntax element indicates an index to a position in RefPicSetLtCurr. If the RPLM type syntax element is equal to 3, the video coder stops the loop of modifying the reference picture list.

When the "ref_pic_list_modification_flag_l0" syntax element is equal to 1, a video coder may process the "list_modification_idc" syntax elements in an order that they occur in the bitstream. For each "list_modification_idc" syntax element, the video coder may determine whether the "list_modification_idc" syntax element is equal to 0, 1, or 2. If the "list_modification_idc" syntax element is equal to 0, 1, or 2, the video coder may invoke a process to move one reference picture to a reference picture index. The video coder may provide an index refIdxL0 as input to the process and may set refIdxL0 to the output of the process. RefIdxL0 is an index into list 0. The video coder may initially set refIdxL0 to be equal to 0. The process to move one reference picture to a reference picture index is described below. Otherwise, if the "list_modification_idc" syntax element is equal to 3, the video coder stops the reference picture list modification process for list 0.

When a current slice is a B slice and the "ref_pic_list_modification_flag_l1" syntax element is equal to 1, the video coder may process the "list_modification_idc" syntax elements in an order that they occur in the bitstream. For each "list_modification_idc" syntax element, the video coder may determine whether the "list_modification_idc" syntax element is equal to 0, 1, or 2. If the "list_modification_idc" syntax element is equal to 0, 1, or 2, the video coder may invoke a process to move one reference picture to a reference picture index. The video coder may provide an index refIdxL1 as input to the process and may set refIdxL1 to the output of the process. RefIdxL1 is an index into list 1. The video coder may initially set refIdxL1 to be equal to 0. The process to move one reference picture to a reference picture index is described below. Otherwise, if the "list_modification_idc" syntax element is equal to 3, the video coder stops the reference picture list modification process for list 1.

As mentioned above, a video coder may perform a process to move a reference picture to a reference picture index. This process may take the reference picture index as input and output an incremented reference picture index. The reference picture index may be denoted as refIdxLX, where X is equal to 0 for movement of a reference picture in list 0 and X is equal to 1 for movement of a reference picture in list 1. If the "list_modification_idc" syntax element is equal to 0 and the current reference picture list is list 0, the video decoder may designate RefPicSetStCurr0 as the current reference picture set. Otherwise, if the "list_modification_idc" syntax element is equal to 0 and the current reference picture list is list 1, the video coder may designate RefPicStCurr1 as the current reference picture set. If the "list_modification_idc" syntax element is equal to 1 and the current reference picture list is list 0, the video coder may designate RefPicStCurr1 as the current reference picture set. If the "list_modification_idc" syntax element is equal to 1 and the current reference picture list is list 1, the video coder may designate RefPicStCurr0 as the current reference picture set. If the "list_modification_idc" syntax element is equal to 2, the video coder may designate RefPicSetLtCurr as the current reference picture set.

Furthermore, in the process to move a reference picture to a reference picture index, the video coder may determine a relevant POC value, pocLX. The relevant POC value may be the POC value of a reference picture to insert into reference picture list X (where X is 0 or 1) at the position in the current reference picture set indicated by the "ref_pic_set_idx" syntax element. The pocLX variable is generally derived as follows:

pocLX=curRefPicSet[refpic_set_idx]

In addition, the video coder may perform a process described by the following pseudo-code to insert a picture having the relevant POC value into the current reference picture list at the position indicated by refIdxLX (where X is either 0 or 1).

```
for( cIdx = num_ref_idx_lX_active_minus1 + 1; cIdx > refIdxLX; cIdx-- )
    RefPicListX[ cIdx ] = RefPicListX[ cIdx − 1 ]
RefPicListX[ refIdxLX++ ] = pocLX
nIdx = refIdxLX
```

-continued

```
for( cIdx = refIdxLX; cIdx <= num_ref_idx_lX_active_minus1 + 1; cIdx++ )
    if( PicOrderCnt( RefPicListX[ cIdx ] ) != pocLX )
        RefPicListX[ nIdx++ ] = RefPicListX[ cIdx ]
```

In the pseudo-code above cIdx is a counter variable. Furthermore, in the pseudo-code above, num_ref_idx_lX_active_minus1 is a variable equal to the number of active reference pictures in the current reference picture list, minus 1. PicOrderCnt is a function that returns a POC value of a reference picture. When the video coder performs the process described by the pseudo-code above, the video coder may shift the reference pictures following the position indicated by refIdxLX to positions later in the current reference picture list, insert the reference picture with the relevant POC value, increment refIdxLX, and remove from the reference picture list any duplicate of the reference picture with the relevant POC value.

In the pseudo-code above, the length of the current reference picture list may temporarily be one element longer than the length of the final version of the current reference picture list. Accordingly, after the video coder performs the operation described by the pseudo-code above, the video coder may retain only elements 0 through num_ref_idx_lX_active_minus1 in the final version of current reference picture list.

In accordance with the techniques of this disclosure, a video coder derives a RPS for a current view component. As described above, the RPS of the current view component may include the reference picture subsets: RefPicSetStCurr0, RefPicSetStCurr1, RefPicSetStFoll0, RefPicSetStFoll1, RefPicSetLtCurr, RefPicSetLtFoll. In addition, the RPS of the current view component may include an inter-view reference picture set (RefPicSetInterView). The inter-view prediction reference picture set includes view components that are not from a same view as the current view component, that also are from a same access unit as the current view component, and that also are used by the current view component for inter-view prediction reference. In some examples, the inter-view reference picture set is signaled at a sequence level and may be shared by all view components of the same view.

In accordance with aspects of the present disclosure, video encoder 20, following any encoding technique including the previously described syntax elements, may derive RefPicSetInterView using the following pseudo-code:

```
for( j = 0; j < num_ref_views[ VOIdx ]; j++ )
    if (inter_view_texture_flag[ i ][ j ])
        RefPicSetInterView[ j ] = ref_view_idx[ VOIdx ][ j ]
NumRpsInterView = j
```

In coding techniques following the above RefPicSetInterView derivation method, video encoder 20 may only include those reference views where inter_view_texture_flag[i][j] is set equal to 1 for the j-th reference for a given view i in the RefPicSetInterView. For example, as described previously, video encoder 20 may set inter_view_texture_flag[i][j] equal to 1 when the view component with view order index equal to ref_view_idx[i][j] may be used in inter-view texture prediction.

Accordingly, in these examples, video encoder 20 may build the reference picture set RefPicSetInterView by including only those reference views that may be used in inter-view texture prediction. As described previously, inter_view_texture_flag[i][j] may be derived to be equal to 1 when inter_view_texture_idc[i][j] is set to either 1 or 3. That is, the reference views included in RefPicSetInterView all may be used in inter-view texture prediction, but some of them also may be used in inter-view other prediction, such as inter-view motion prediction or inter-view residual prediction.

According to aspects of the present disclosure, video encoder may derive another inter-view reference picture set (OtherRefSetInterView). OtherRefSetInterView may be an inter-prediction reference picture set comprised of all inter-view reference view components that may be used for other types of inter-view prediction, such as interview motion prediction or inter-view residual prediction. Video encoder 20 may use the following pseudo-code to derive OtherRefSetInterView.

```
for( j = 0; j < num_ref_views[ VOIdx ]; j++ )
    if (InterViewOtherFlag[ i ][ j ])
        OtherRefSetInterView[ j ] = ref_view_idx[ VOIdx ][ j ]
NumOtherRefInterView = j
```

Similar to the pseudo code in the above example where video encoder 20 derives RefPicSetInterView according to only those reference views that may be used in inter-view texture prediction, video encoder 20 may only include those inter-view references in OtherRefSetInterView for which InterViewOtherFlag[i][j] is set equal to 1. As described above, video encoder 20 may set InterViewOtherFlag[i][j] equal to 1 when the view component with view order index equal to ref_view_idx[i][j] may be used in inter-view prediction types other than inter-view texture prediction, such as inter-view motion prediction and inter-view residual prediction. Accordingly, in these examples, video encoder 20 may build the reference picture set OtherRefSetInterView by including only those reference views that may be used in other types of inter-view prediction. As described previously, InterViewOtherFlag[i][j] may be derived to be equal to 1 when inter_view_texture_idc[i][j] is set to either 2 or 3. That is, the reference views included in OtherRefSetInterView all may be used in inter-view prediction types other than inter-view texture prediction (such as inter-view motion prediction or inter-view residual prediction), but some of them may also be used in inter-view texture prediction.

Although the above described construction of RefPicSetInterView and OtherRefSetInterView related to multi-view video and 3D video coding, a similar process may be applied to techniques using scalable video coding. For example, the RefPicSetInterView and OtherRefSetInterView elements may be constructed using the same pseudo code. However, instead of the element containing only views that may be used in inter-view texture prediction and in other types of inter-view prediction, respectively, the elements would contain only scalable layers that may be used in inter-layer texture prediction and in other types of inter-layer prediction, respectively. As described previously with respect to the inter_view_texture_flag [i][j] and inter_view_texture_idc [i][j] elements, some of the elements may be named differently without changing their essential operation.

For a view component of a current view, inter-view components of OtherRefSetInterView[j] may be ordered by an increasing order index of j, where j ranges from 0 to NumOtherRefInterView−1, inclusive. Video encoder 20 may step through OtherRefSetInterView[j] from 0 to NumOtherRefInterView−1 until video encoder 20 finds a suitable predictor. Once video encoder 20 finds a suitable predictor reference view, video encoder 20 selects the predictor and other inter-view components are not checked.

Video encoder 20 may generate, based on a reference picture set of a current view component of an access unit, a reference picture list for the current view component. The reference picture set may include one or more inter-view reference picture sets, e.g. RefPicSetInterView, OtherRefSetInterView, and other inter-view reference sets described herein, that includes a plurality of view components that belong to the access unit and that are associated with different views. When generating the reference picture list, video encoder 20 may exclude those reference views with an index that does not belong to RefPicSetInterView. Accordingly, those reference views that may only be used for inter-view prediction types other than inter-view texture prediction, such as inter-view motion prediction or inter-view residual prediction, are not used in reference picture list initialization or modification, as described previously.

Furthermore, video encoder 20 may encode the current view component based on one or more reference pictures in the reference picture list. Video encoder 20 may generate a bitstream that includes syntax elements indicating the reference picture set of the current view component.

Furthermore, in accordance with the techniques of this disclosure, video decoder 30 may parse, from a bitstream, syntax elements indicating a reference picture set of a current view component of an access unit, the reference picture set including an inter-view reference picture set that includes a plurality of view components that belong to the access unit and that are associated with different views. Video decoder 30 may generate, based on the reference picture set, a reference picture list for the current view component. In addition, video decoder 30 may decode the current view component based at least in part on one or more reference pictures in the reference picture list.

When a video coder (such as video encoder 20 or video decoder 30) initializes reference picture lists 0 and 1 for the current view component, the video coder includes reference view components from RefPicSetInterView in reference picture lists 0 and 1. In some examples, the video coder generates reference picture lists 0 and 1 such that reference picture lists 0 and 1 include each view component of the inter-view reference picture set (RefPicSetInterView). The video coder may include reference view components from RefPicSetInterView at various locations in reference picture lists 0 and 1 according to various predefined orders.

In a first example order, the video coder initializes reference picture list 0 such that view components in RefPicSetStCurr0 are listed first, followed by view components in RefPicSetInterView, view components in RefPicSetStCurr1, and view components in RefPicSetLtCurr. In this example, the video coder initializes reference picture list 1 such that view components in RefPicSetStCurr1 are listed first, followed by view components in RefPicSetInterView, view components in RefPicSetStCurr0, and view components in RefPicSetLtCurr. Thus, in this example, video decoder 30 may generate a reference picture list (e.g., list 0 or list 1) such that a first subset (i.e., RefPicSetStCurr0) or a second subset (i.e., RefPicSetStCurr1) occurs first in the reference picture list, followed by the inter-view reference picture set (i.e., RefPicSetInterView).

In a second example order, the video coder initializes reference picture list 0 such that view components in RefPicSetStCurr0 are listed first, followed by view components in RefPicSetStCurr1, view components in RefPicSetInterView, and view components in RefPicSetLtCurr. In this example, the video coder initializes reference picture list 1 such that view components in RefPicSetStCurr1 are listed first, followed by view components in RefPicSetStCurr0, view components in RefPicSetInterView, and view components in RefPicSetLtCurr. Thus, in this example, video decoder 30 may generate a reference picture list (e.g., list 0 or list 1) such that a first subset (i.e., RefPicSetStCurr0) and a second subset (i.e., RefPicSetStCurr1) occur in the reference picture list, followed by the inter-view reference picture set (i.e., RefPicSetInterView).

In a third example order, the video coder initializes reference picture list 0 such that view components in RefPicSetStCurr0 are listed first, followed by view components in RefPicSetStCurr1, view components in RefPicSetLtCurr, and view components in RefPicSetInterView. In this example, the video coder initializes reference picture list 1 such that view components in RefPicSetStCurr1 are listed first, followed by view components in RefPicSetStCurr0, view components in RefPicSetLtCurr, and view components in RefPicSetInterView. Thus, in this third example, the view components of the RefPicSetInterView (the inter-view reference picture set) occur last in the reference picture lists 0 and 1. That is, in this example, video decoder 30 may generate a reference picture list (e.g., list 0 or list 1) such that a first subset (i.e., RefPicSetStCurr0), a second subset (i.e., RefPicSetStCurr1), a fifth subset (i.e., RefPicSetLtCurr) occur in the reference picture list, followed by the inter-view reference picture set (i.e., RefPicSetInterView).

In some examples, RefPicSetInterView is subdivided into two subsets: RefPicSetInterViewFwd and RefPicSetInterViewBwd. RefPicSetInterViewFwd includes those reference view components of RefPicSetInterView that have view identifiers less than a view identifier of the current view component. RefPicSetInterViewBwd includes those reference view components of RefPicSetInterView that have view identifiers greater than the view identifier of the current view component. The order of the view components in RefPicSetInterViewFwd and the order of the views in RefPicSetInterViewBwd are the same as signaled in a corresponding SPS. That is, for any view A and view B, if the views A and B both have view_id values greater than the view_id of the current view and view A precedes view B in the SPS, then a view component of view A precedes a view component of view B in RefPicSetInterViewBwd. If views A and B both have view_id values less than the view_id of the current view and view A precedes view B in the SPS, then the view component of view A precedes the view component of view B in RefPicSetInterViewFwd.

In other examples, RefPicSetInterViewFwd includes those reference view components of RefPicSetInterView that have view order indexes less than a view order index of the current view component. RefPicSetInterViewBwd includes those reference view components of RefPicSetInterView that have view order indexes greater than the view order index of the current view component. The order of the view components in RefPicSetInterViewFwd and the order of the views in RefPicSetInterViewBwd are the same as signaled in a corresponding SPS. That is, for any view A and view B, if the views A and B both have view order index values greater than the view order index of the current view and view A precedes view B in the SPS, then a view component of view A precedes a view component of view B in RefPicSetInterViewBwd. If views A and B both have view order index values less than the view order index of the current view and view A precedes view B in the SPS, then the view component of view A precedes the view component of view B in RefPicSetInterViewFwd.

In some examples, RefPicSetInterView is derived by using view dependency syntax elements as signaled in a sequence parameter set. In such examples, RefPicSetInterViewFwd may be derived to be equal to anchor_ref_l0[i][j] when the current view component belongs to an anchor access unit, which is equivalent to a clean random access (CRA) access unit. RefPicSetInterViewFwd may be derived to be equal to non_anchor_ref_l0[i][j] when the current view component belongs to a non-anchor access unit, for all j values. RefPicSetInterViewBwd is derived to be equal to anchor_ref_l1[i][j] when the current view component belongs to an anchor access unit, which is equivalent to a CRA access unit. RefPicSetInterViewBwd may be derived to be equal to non_anchor_ref_l0[i][j] when the current view component belongs to a non-anchor access unit, for all j values.

In some examples where RefPicSetInterView is subdivided into RefPicSetInterViewFwd and RefPicSetInterViewBwd, the video coder may initialize reference picture list 0 such that reference picture list 0 includes reference view components from RefPicSetStCurr0, RefPicSetStCurr1, RefPicSetLtCurr, and RefPicSetInterViewFwd, but not reference view components from RefPicSetInterviewBwd. The video coder may initialize reference picture list 1 such that reference picture list 1 includes reference view components from RefPicSetStCurr0, RefPicSetStCurr1, RefPicSetLtCurrn and RefPicSetInterViewBwd, but not reference view components from RefPicSetInterViewFwd.

Thus, the video coder may generate a first reference picture list (e.g., list 0) such that the first reference picture list includes a first subset of the inter-view reference pictures (e.g., RefPicInterViewFwd) and not a second subset of the inter-view reference pictures (e.g., RefPicInterViewBwd). Furthermore, the video coder may generate a second reference picture list (e.g., list 1) such that the second reference picture list includes the second subset of the inter-view reference pictures (e.g., RefPicInterViewBwd) and not the first subset of the inter-view reference pictures (e.g., RefPicInterViewFwd).

Alternatively, in some examples where RefPicSetInterView is subdivided into RefPicSetInterViewFwd and RefPicSetInterViewBwd, the video coder may initialize reference picture lists 0 and 1 according to the first, second, or third example orders described above. However, when the video coder includes inter-view reference view components in reference picture list 0, the video coder may include each inter-view reference view component from RefPicSetInterViewFwd before inter-view reference view components from RefPicSetInterViewBwd. When the video coder includes inter-view reference view components in reference picture list 1, the video coder may include each inter-view reference view component from RefPicSetInterViewBwd before any inter-view reference view components from RefPicSetInterViewFwd.

Figure 4:
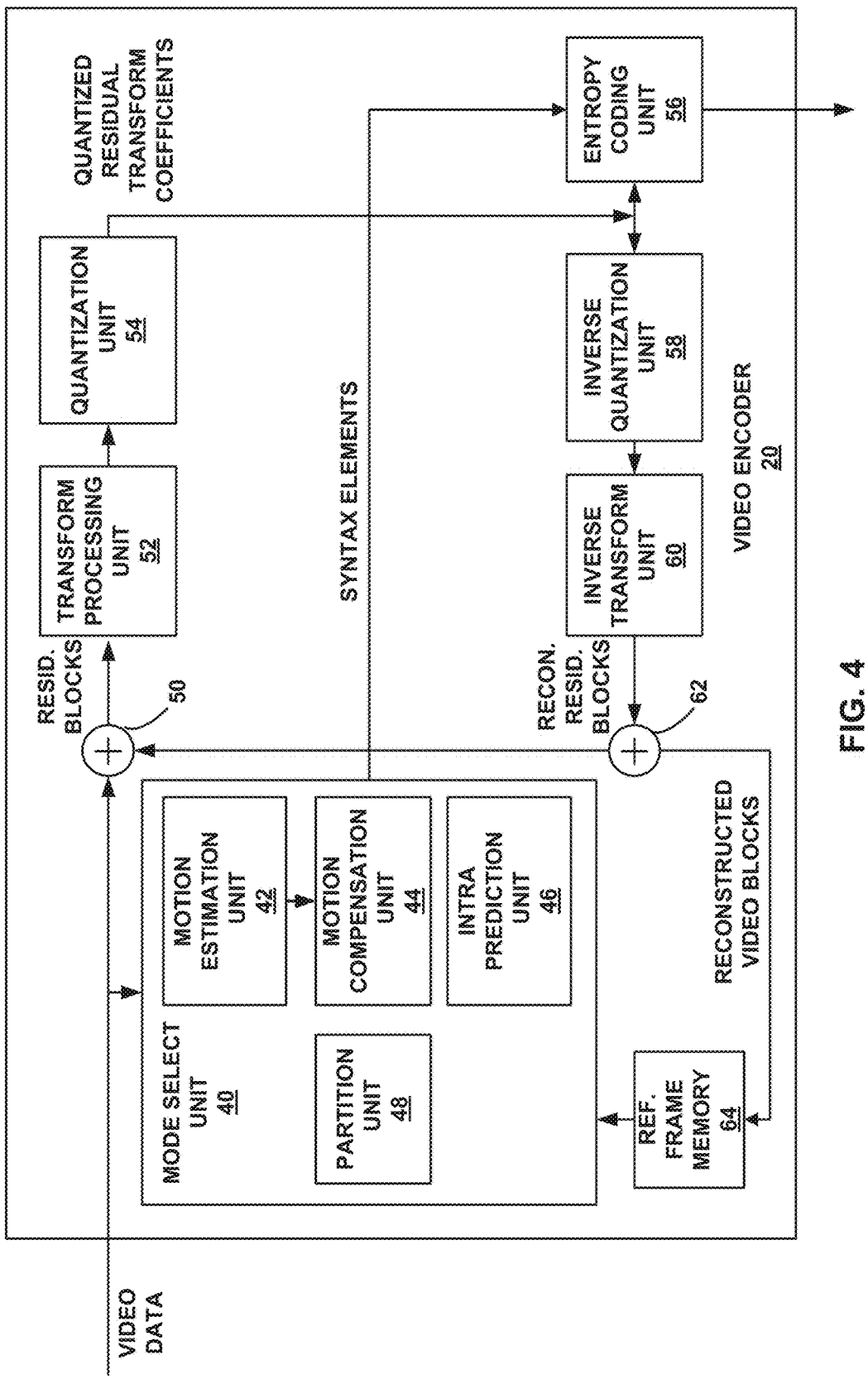
FIG. 4 is a block diagram illustrating an example video encoder that may implement techniques of this disclosure.

FIG. 4 is a block diagram illustrating an example of video encoder 20 that may implement techniques of this disclosure. Video encoder 20 may perform intra- and inter-coding of blocks within video frames, including blocks, or partitions or sub-partitions of blocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 4, it should be understood that video encoder 20 may further include components for intra-mode encoding. However, such components are not illustrated for the sake of brevity and clarity.

As shown in FIG. 4, video encoder 20 receives a current video block within a video frame to be encoded. In the example of FIG. 4, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 4) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction unit 46 may alternatively perform intra-predictive coding of the received video block relative to one or more neighboring blocks in the same frame or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a block. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame memory 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame memory 64 may be organized according to these lists.

Motion estimation unit 42 compares blocks of one or more reference frames from reference frame memory 64 to a block to be encoded of a current frame, e.g., a P-frame or a B-frame. When the reference frames in reference frame memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame memory 64 if no values for sub-integer pixel positions are stored in reference frame memory 64. Motion estimation unit 42 sends the calculated motion vector to entropy coding unit 56 and motion compensation unit 44. The reference frame block identified by a motion vector may be referred to as a predictive block. Motion compensation unit 44 may calculate prediction data based on the predictive block.

Intra-prediction unit 46 may intra-predict a current block, as an alternative to the inter-prediction performed by motion estimation unit 42 and motion compensation unit 44 described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block. After selecting an intra-prediction mode for a block, intra-prediction unit 46 may provide information indicative of the selected intra-prediction mode for the block to entropy coding unit 56.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard or the upcoming HEVC standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring blocks.

In some cases, entropy coding unit 56 or another unit of video encoder 20 may be configured to perform other coding functions, in addition to entropy coding. For example, entropy coding unit 56 may be configured to determine the CBP values for the blocks and partitions. Also, in some cases, entropy coding unit 56 may perform run length coding of the coefficients in a block or partition thereof. In particular, entropy coding unit 56 may apply a zig-zag scan or other scan pattern to scan the transform coefficients in a block or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video encoder 20 may generate a number of syntax elements, as described above, which may be encoded by entropy encoding unit 56 or another encoding unit of video encoder 20. In some examples, video encoder 20 may generate and encode syntax elements for an MVC bitstream, as described above.

As noted above, video encoder 20 may signal view dependencies, i.e. which views a decoder may use in inter-view prediction in order to reconstruct a given view. According to aspects of this disclosure, also noted above, video encoder 20 may further signal the type of inter-view prediction associated with dependent view. For example, video encoder 20 may signal that a particular dependent view is associated with inter-view texture prediction, inter-view motion prediction, and/or interview residual prediction for a given view.

Also as noted above, video encoder 20 may signal scalable layer dependencies, i.e. which scalable layers a decoder may use in inter-layer prediction in order to reconstruct a given scalable layer. According to aspects of this disclosure, also noted above, video encoder 20 may further signal the type of inter-layer prediction associated with dependent scalable layers. For example, video encoder 20 may signal that a particular dependent scalable layer is associated with inter-layer texture prediction, inter-layer motion prediction, and/or inter-layer residual prediction for a given layer.

Also according to aspects of this disclosure, video encoder 20 may construct one or more reference picture lists (lost 0 and list 1). Video encoder 20 may further construct one or more reference picture sets (RPS) and subsets. According to aspects of this disclosure, video encoder 20 may construct the one or more reference picture lists or one or more reference picture sets or subsets based on the type of inter-view prediction associated with the candidate reference views. For example, video encoder may exclude some or all of reference candidate views that may be used for only one type of inter-view prediction, such as inter-view texture prediction, inter-view motion prediction, and inter-view residual prediction. In examples applicable to scalable video coding techniques, video encoder 20 may construct one or more reference pictures lists and one or more reference picture sets or subsets based on the type of inter-layer prediction with the candidate scalable layers.

Figure 5:
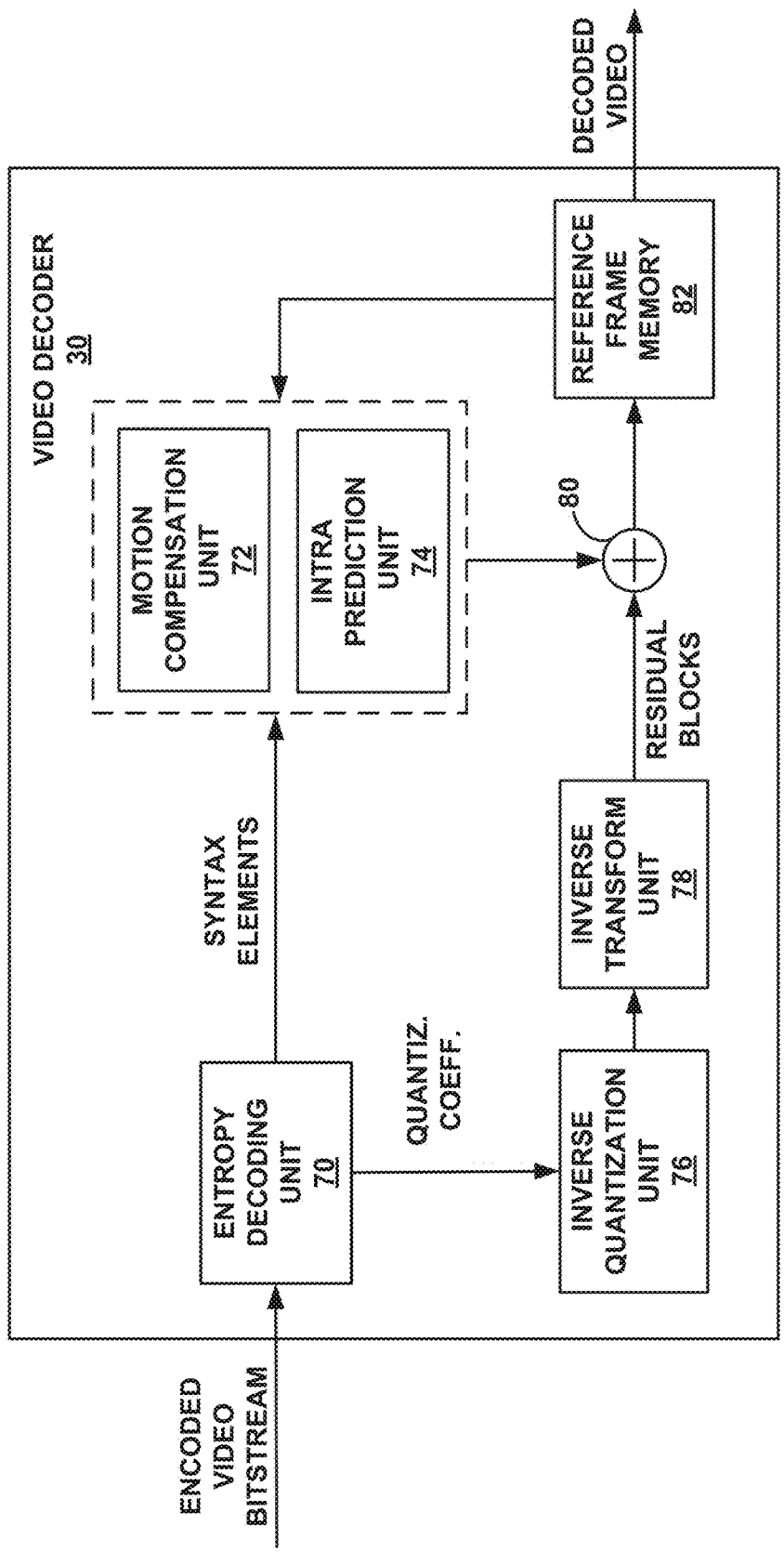
FIG. 5 is a block diagram illustrating an example video decoder that may implement the techniques of this disclosure.

FIG. 5 is a block diagram illustrating an example of video decoder 30 that may implement the techniques of this disclosure. In the example of FIG. 5, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 4). Motion compensation unit 72 may generate prediction data based on motion vectors received from entropy decoding unit 70.

During the decoding process, video decoder receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other syntax elements to motion compensation unit 72 and intra-prediction unit 74. Video decoder 30 may receive the syntax elements at the video slice level and/or the video block level.

For example, video decoder 30 may receive a number of syntax elements in various parameter sets from video encoder 20. Parameter sets may contain the sequence-level header information, such as SPS, PPS, or other parameter sets described above.

According to aspects of this disclosure, video decoder 30 may receive syntax elements indicating view dependencies between inter-view prediction references. For example, one or more syntax elements may specify, for a given view, all of the inter-view dependent views that may be used by video decoder 30 to reconstruct the given view by allowing video decoder 30 to perform one or more of the inter-view prediction processes described above, i.e. inter-view texture prediction, inter-view motion prediction, and inter-view residual prediction. Video decoder 30 may also receive one or more other syntax elements which indicate the type or types of inter-view prediction associated with each dependent inter-view reference.

In some examples, according to aspects of this disclosure, video decoder 30 may derive one or more reference picture lists or reference picture sets (RPS) or subsets. For example, video decoder 30 may receive one or more syntax elements indication inter-view dependencies between inter-view references. Additionally, video decoder 30 may receive one or more syntax elements indicating the type of inter-view, prediction, i.e., inter-view texture, inter-view motion, and inter-view residual prediction for each of the inter-view reference pictures. Based on the type or types of inter-view prediction associated with each inter-view reference, or, in some examples based on the number of different types of inter-view prediction associated with each inter-view reference, video decoder 30 may construct the reference picture lists, sets, or subsets so as to exclude or minimize the inter-view references included in the final lists, sets, and subsets which only are associated with a particular type of inter-view prediction. Alternatively, video decoder 30 may construct the reference picture lists, sets, or subsets so as to exclude or minimize the inter-view references included in the final lists, sets, and subsets which only are associated with a single type of inter-view prediction. Furthermore, video coder 30 may operate in a similar manner with respect to scalable video coding techniques, except where the dependencies are inter-layer dependencies.

Motion compensation unit 72 may use motion vectors received in the bitstream to identify a prediction block in reference frames in reference frame memory 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 20 for each block to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of blocks used to encode frame(s) of the encoded video sequence, partition information that describes how each block of a frame of the encoded video sequence is partitioned, modes indicating how each partition is encoded, one or more reference frames (and reference frame lists) for each inter-encoded block or partition, and other information to decode the encoded video sequence.

Summer 80 sums the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame memory 82, which provides reference blocks for subsequent motion compensation and also produces decoded video for presentation on a display device (such as display device 32 of FIG. 1).

Figure 6:
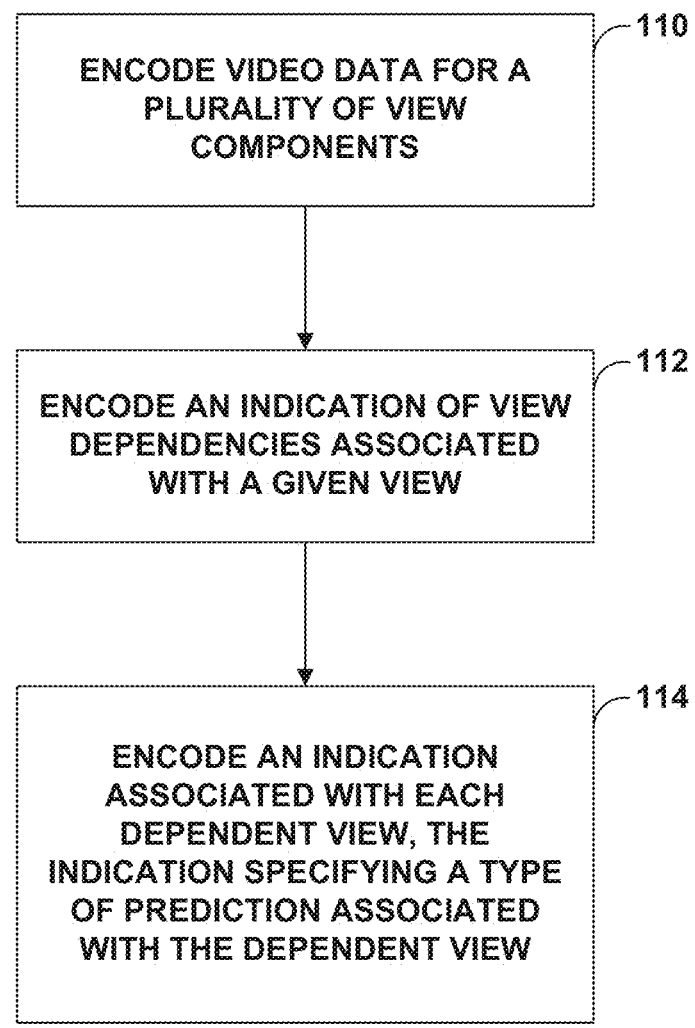
FIG. 6 is a flow diagram illustrating an example method of encoding a multi-view bitstream.

FIG. 6 is a flow diagram illustrating an example method of encoding a multi-view bitstream. The example shown in FIG. 6 is generally described as being performed by video encoder 20 (FIGS. 1 and 4). However, it should be understood that the process described with respect to FIG. 6 may be carried out by a variety of other processors, processing units, hardware-based coding units such as encoder/decoders (CODECs), and the like.

In the example of FIG. 6, video encoder 20 may encode video data for a plurality of view components (110). For example, video encoder 20 may encode a plurality of a plurality of different views, with each view corresponding to a different perspective, or angle, at which corresponding video data of a common scene was captured. As noted above, a particular picture of a particular view is referred to as a view component. That is, a view component of a view corresponds to particular temporal instance of the view.

Video encoder 20 may also encode an indication of view dependency relationships (112). For example, for a given view, video encoder 20 may use other views to predict data in the given view. As described above, this prediction may be inter-view prediction, and, more specifically, may be inter-view texture prediction or other inter-view prediction, such as inter-view motion prediction or inter-view residual prediction. Video encoder 20 may determine that each view video encoder 20 may use in inter-view prediction of a portion of a given view is a dependent view. As described above, video encoder 20 may specify these inter-view prediction references as dependent views in lists such as RefPicList0 and RefPicList1. Further, video encoder 20 may keep track of the inter-view prediction references associated with a given view by using one or more syntax elements. For example, as described above, video encoder 20 may use a syntax element such as ref_view_idx[i][j] to specify a view order index of an inter-view prediction reference.

In some examples, according to aspects of this disclosure, video encoder 20 may encode an indication associated with each dependent view, the indication specifying a type of prediction associated with the dependent view (114). For example, each inter-view prediction reference may be associated with one or more types of inter-prediction for a given view. Video encoder 20 may determine which inter-prediction types the inter-view prediction reference is associated with (i.e. one or more of inter-view texture prediction, inter-view motion prediction, and inter-view residual prediction). Video encoder 20 may indicate the types of inter-prediction associated with each inter-view prediction reference using one or more syntax elements.

According to aspects of this disclosure, as described above, video encoder 20 may encode a syntax element such as inter_view_texture_flag[i][j] to specify whether the interview prediction reference with view order index equal to ref_view_idx[i][j] is to be included in the inter-view RPS subset to be used for reference picture list construction. In at least some examples, when inter_view_texture_flag[i][j] is set equal to 0, this may mean that the inter-view prediction reference with view order index equal to ref_view_idx[i][j] is not used in inter-view texture prediction.

According to aspects of the present disclosure, video encoder 20 may encode additional syntax elements which may specify additional types of inter-prediction associated with inter-view prediction references. For example, as described previously, video encoder 20 may use a syntax element such as InterViewOtherFlag[i][j]. InterViewOtherFlag[i][j] may indicate whether the inter-view prediction reference with view order index equal to ref_view_idx[i][j] may be used for other inter-view prediction, for example inter-view texture prediction or inter-view residula prediciton, for a given view i.

In other examples according to aspects of the present disclosure, video encoder may employ another syntax element, such as inter_view_texture_idc[i][j], which may indicate both whether the inter-view prediction reference with view order index equal to ref_view_idx[i][j] may be used for inter-view texture prediction and whether the inter-view prediction reference may be used for other inter-view prediction. Based on the determination of inter_view_texture_idc[i][j], video encoder 20 may derive other syntax elements, such as inter_view_texture_flag[i][j] and InterViewOtherFlag[i][j].

As described previously, the same techniques as described with respect to FIG. 6 may be applied in the context of a scalable video coding implementation, except that the dependencies relate to inter-layer dependencies as opposed to inter-view dependencies.

Figure 7:
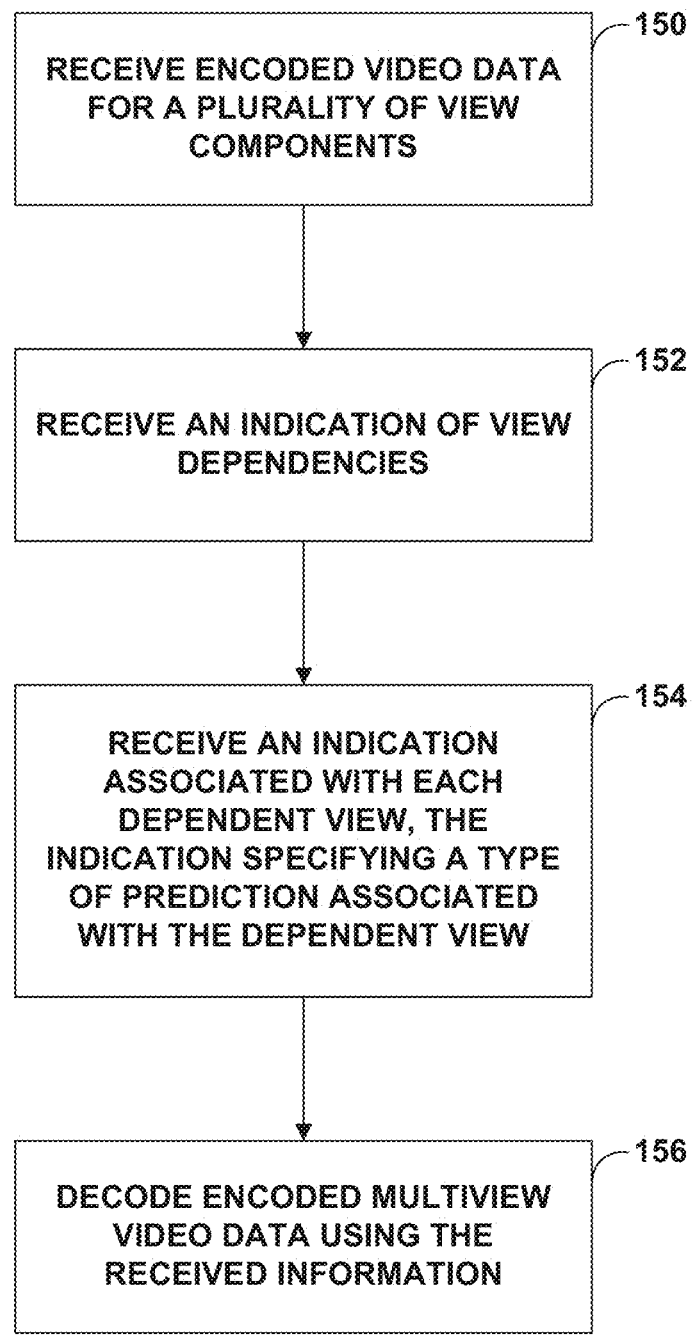
FIG. 7 is a flow diagram illustrating an example method of decoding a multi-view bitstream.

FIG. 7 is a flow diagram illustrating an example method of decoding a multi-view bitstream. The example shown in FIG. 7 is generally described as being performed by video decoder 30 (FIGS. 1 and 5). However, it should be understood that the process described with respect to FIG. 7 may be carried out by a variety of other processors, processing units, hardware-based coding units such as encoder/decoders (CODECs), and the like.

In the example of FIG. 7, video decoder 30 may receive encoded video data for a plurality of view components (150). The encoded video data may include a plurality of different views, with each view corresponding to a different perspective, or angle, at which corresponding video data of a common scene was captured.

According to aspects of the present disclosure, as described with respect to FIG. 6, video decoder 30 may additionally receive an indication of view dependencies (152). For example, video decoder 30 may receive one or more syntax elements or reference picture lists or sets that indicate view depenedency relationships between views.

According to aspects of the present disclosure, video decoder may also receive an indication associated with each dependent view, the indication specifying a type of prediction associated with the dependent view (154). For example video decoder 30 may receive one or more syntax elements from video encoder 20 or an intervening device. These syntax elements, such as inter_view_texture_flag[i][j], inter_view_texture_idc[i][j], and InterViewOtherFlag[i][j] described with respect to FIG. 6, may indicate one or more specific types of inter-prediction relationships between a given view i and all of given view i's dependent views.

Video decoder 30 may also decode the multiview video data using the received information (156). That is, for example, video decoder may decode each of the views, and determine the appropriate view identifier using the received separate information. Video decoder 30 may then present a 3D representation using the views, e.g., on display device 32.

As described previously, the same techniques described with respect to FIG. 7 may be applied in the context of a scalable video coding implementation, except that the dependencies relate to inter-layer dependencies as opposed to inter-view dependencies.

Figure 8:
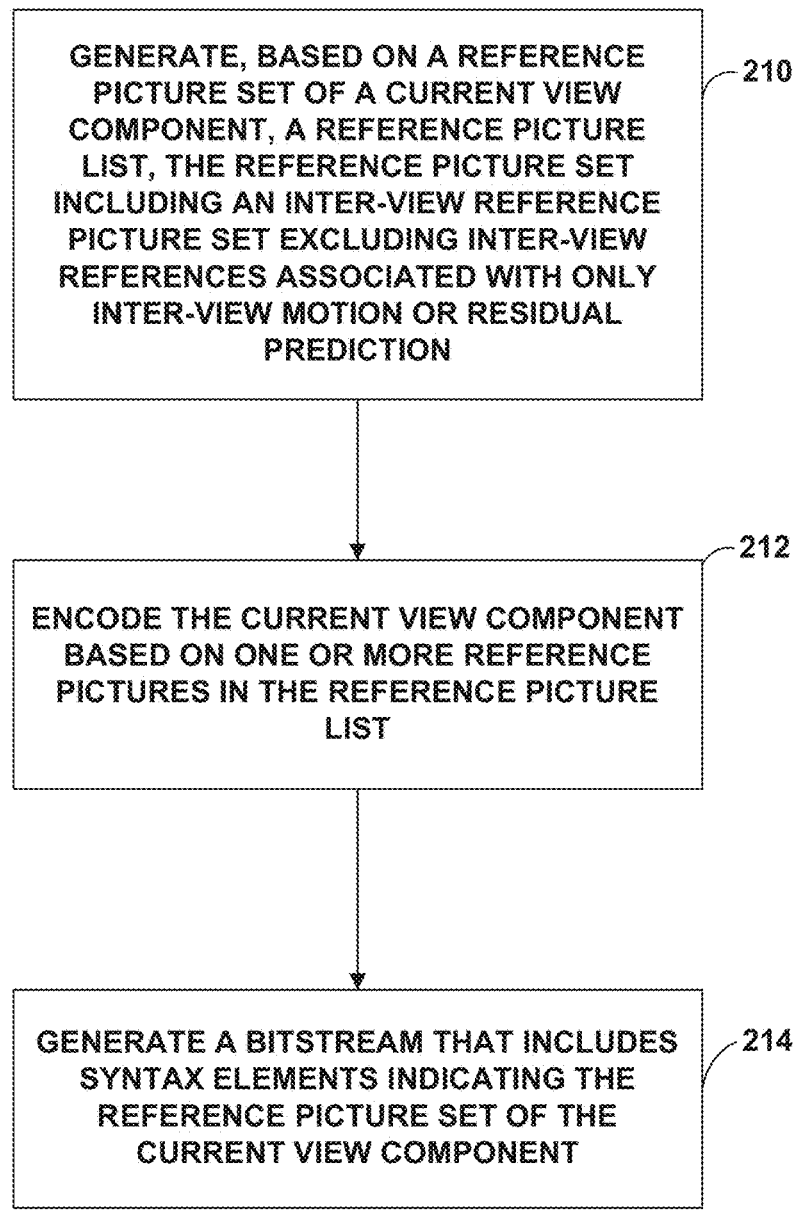
FIG. 8 is a flow diagram illustrating an example method of encoding a multi-view bitstream.

FIG. 8 is a flow diagram illustrating an example method of encoding a multi-view bitstream. The example shown in FIG. 8 is generally described as being performed by video encoder 20 (FIGS. 1 and 4). In other examples, the process described with respect to FIG. 8 may be carried out by a variety of other processors, processing units, hardware-based coding units such as encoder/decoders (CODECs), and the like. In the example of FIG. 8, video encoder 20 may generate, based on a reference picture set of a current view component, a reference picture list, the reference picture set including an inter-view reference picture set excluding inter-view references associated with only inter-view motion or residual prediction (210).

In accordance with aspects of this disclosure, in at least one example, video encoder 20 may signal the specific inter-view prediction type or types associated with the inter-view prediction references. For example, video encoder 20 may use one or more syntax elements, such as those described previously herein and further described in relation to FIG. 6. Additionally, video encoder 20 may derive a reference picture set including one or more reference picture sets, such as RefPicSetInterView and OtherRefSetInterView. In some examples, video encoder 20 may derive RefPicSetInterView to exclude inter-view references which are associated with only inter-view prediction other than inter-view texture prediction, such as inter-view motion prediction or inter-view residual prediction. Including inter-view references that are only associated with inter-view prediction other than inter-view texture prediction in the inter-view reference picture sets may decrease coding efficiency. Video encoder 20 may also derive OtherRefSetInterView, which may be a reference picture set that includes all inter-view references that are associated with types of inter-view prediction other than inter-view texture prediction. Although, this does not exclude those inter-view references that are also associated with inter-view texture prediction.

Video encoder 20 may also, encode the current view component based on one or more reference pictures in the reference picture list (212). Video encoder 20 may generate a bitstream that includes syntax elements indicating the reference picture set of the current view component (214).

It should be understood that the steps shown and described with respect to FIG. 8 are provided as merely one example. That is, the steps of the method of FIG. 8 need not necessarily be performed in the order shown in FIG. 8, and fewer, additional, or alternative steps may be performed.

As described previously, the same techniques described with respect to FIG. 8 may be applied in the context of a scalable video coding implementation, except that the dependencies relate to inter-layer dependencies as opposed to inter-view dependencies.

Figure 9:
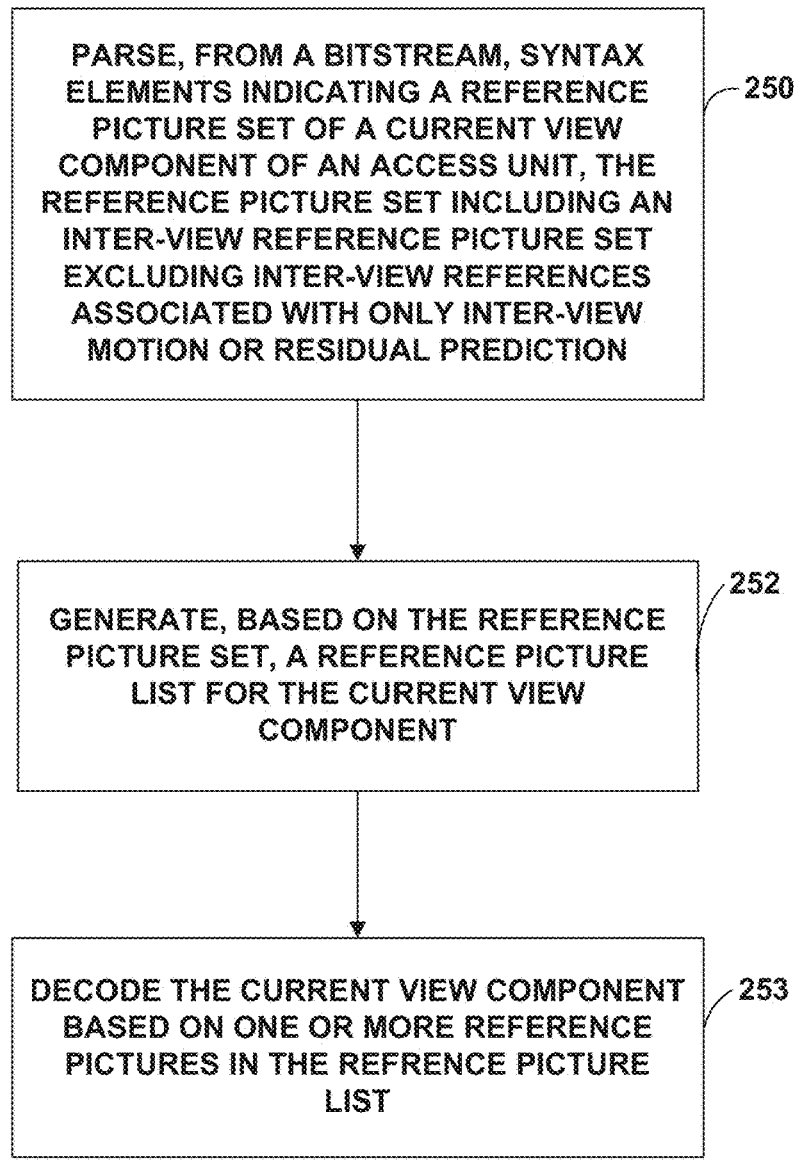
FIG. 9 is a flow diagram illustrating an example method of decoding a multi-view bitstream.

FIG. 9 is a flow diagram illustrating an example method of decoding a multi-view bitstream. The example shown in FIG. 9 is generally described as being performed by video decoder 30 (FIGS. 1 and 5). In other examples, the process described with respect to FIG. 9 may be carried out by a variety of other processors, processing units, hardware-based coding units such as encoder/decoders (CODECs), and the like.

In the example shown in FIG. 9, video decoder 30 may parse, from a bitstream, syntax elements indicating a reference picture set of a current view component of an access unit, the reference picture set including an inter-view reference picture set excluding inter-view references associated with only inter-view motion or residual prediction (250). For example, one or more of the syntax elements, such as those described previously herein and further described in relation to FIG. 6, specify inter-prediction relationships associated with dependent views. According to aspects of the present disclosure, the syntax elements also may specify a reference picture set including one or more reference picture sets, such as RefPicSetInterView and OtherRefSetInterView. In some examples, RefPicSetInterView may be a reference picture set that excludes inter-view references which are associated with only inter-view prediction other than inter-view texture prediction, such as inter-view motion prediction or inter-view residual prediction. OtherRefSetInterView may be a reference picture set that includes all inter-view references that are associated with types of inter-view prediction other than inter-view texture prediction. Although, this does not exclude those inter-view references that are also associated with inter-view texture prediction. According to some examples, video decoder 30 may derive the one or more reference picture sets based on the parsed syntax elements.

In accordance with aspects of this disclosure, in at least one example, video decoder 30 may generate, based on the reference picture set, a reference picture list for the current view component (252). Video decoder 30 may also, encode the current view component based on one or more reference pictures in the reference picture list (253).

It should be understood that the steps shown and described with respect to FIG. 9 are provided as merely one example. That is, the steps of the method of FIG. 9 need not necessarily be performed in the order shown in FIG. 9, and fewer, additional, or alternative steps may be performed.

As described previously, the same techniques described with respect to FIG. 9 may be applied in the context of a scalable video coding implementation, except that the dependencies relate to inter-layer dependencies as opposed to inter-view dependencies.

While certain syntax elements described with respect to this disclosure have been provided example names for purposes of explanation, it should be understood that the concepts described in this disclosure are more generally applicable to any syntax elements, regardless of name. For example, while certain aspects refer to a "inter_view_texture_flag[i][j]," "inter_view_texture_idc[i][j]" or "InterViewOtherFlag[i][j]," it should be understood that such a syntax element may be given an alternative name in a future coding standard.

While certain techniques of this disclosure are described with respect to MVC/AVC and other modified coding techniques, including the emerging HEVC standard, it should be understood that the techniques are not limited to any particular coding standard. That is, the techniques more generally relate to achieving coding efficiencies in multi-view video coding, for example, through signaling types of inter-view predictions associated with inter-view references in addition to signaling the inter-view references as dependent views. In some examples, certain inter-view references may be excluded from reference picture lists based on the type or types of inter-view prediction associated with the inter-view references. In other examples, interview references may be excluded from reference picture lists based on the number of inter-view prediction types associated with the interview picture references. Minimizing the inter-view references included in reference picture lists that may only be used for inter-view texture prediction, or more generally only a single type of inter-view prediction, may increase coding efficiency by allowing for smaller reference picture lists.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In still other examples, this disclosure contemplates a computer readable medium comprising a data structure stored thereon, wherein the data structure includes an encoded bitstream consistent with this disclosure. In particular, the encoded bitstream may include first syntax elements to signal the view dependencies, and second syntax elements to signal the type of prediction associated with one or more of the view dependencies. Such syntax elements may be signaled in a sequence parameter set (SPS).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed:

1. A method of decoding video data, the method comprising:
    obtaining, from a coded bitstream, a syntax element specifying a number of dependent layers associated with a given layer, the dependent layers associated with the given layer being layers available to be used to decode the given layer;
    for each respective dependent layer of the dependent layers associated with the given layer:
        obtaining, from the coded bitstream, a first syntax element for the respective dependent layer, the first syntax element for the respective dependent layer specifying a view index of the respective dependent layer; and
        obtaining, from the coded bitstream, a second syntax element for the respective dependent layer, distinct from the first syntax element for the respective dependent layer, the second syntax element for the respective dependent layer indicating which one of the following types of prediction is usable with the respective dependent layer:
            (1) texture prediction but not motion prediction,
            (2) motion prediction but not texture prediction, and
            (3) both texture prediction and motion prediction;
    constructing a reference picture set (RPS) that includes an inter-view reference picture set, wherein the dependent layers associated with the given layer include a particular dependent layer and, based on the second syntax element for the particular dependent layer indicating that the type of prediction usable with the particular dependent layer is texture prediction, the inter-view reference picture set includes a view component with a view order index equal to a view index of the particular dependent layer; and
    using a reference picture in the RPS for inter prediction of a coded picture of the video data.

2. The method of claim 1, wherein the given layer is one of:
    a view;
    a texture component of a view;
    a depth component of a view;
    a spatial scalable layer; and
    a quality scalable layer.

3. The method of claim 1,
    wherein obtaining, from the coded bitstream, the first syntax element for the respective dependent layer comprises obtaining, from a sequence parameter set of the coded bitstream, the first syntax element for the respective dependent layer, and
    wherein obtaining, from the coded bitstream, the second syntax element for the respective dependent layer comprises obtaining, from the sequence parameter set, the second syntax element for the respective dependent layer.

4. A method of encoding video data, the method comprising:
    including, in a coded bitstream, a syntax element specifying a number of dependent layers associated with a given layer, the dependent layers associated with the given layer being layers available to be used to decode the given layer;
    for each respective dependent layer of the dependent layers associated with the given layer:
        including, in the coded bitstream, a first syntax element for the respective dependent layer, the first syntax element for the respective dependent layer specifying a view index of the respective dependent layer;
        including, in the coded bitstream, a second syntax element for the respective dependent layer, distinct from the first syntax element for the respective dependent layer, the second syntax element for the respective dependent layer indicating which one of the following types of prediction is usable with the respective dependent layer:
            (1) texture prediction but not motion prediction,
            (2) motion prediction but not texture prediction, and
            (3) both texture prediction and motion prediction;
    constructing a reference picture set (RPS) that includes an inter-view reference picture set, wherein the dependent layers associated with the given layer include a particular dependent layer and, based on the second syntax element for the particular dependent layer indicating that the type of prediction usable with the particular dependent layer is texture prediction, the inter-view reference picture set includes a view component with a view order index equal to a view index of the particular dependent layer; and
    using a reference picture in the RPS for inter prediction of a coded picture of the video data.

5. The method of claim 4, wherein the given layer is one of:
    a view;
    a texture component of a view;
    a depth component of a view;
    a spatial scalable layer; and
    a quality scalable layer.

6. The method of claim 4,
    wherein including, in the coded bitstream, the first syntax element for the respective dependent layer comprises including, in a sequence parameter set of the coded bitstream, the first syntax element for the respective dependent layer, and
    wherein including, in the coded bitstream, the second syntax element for the respective dependent layer comprises including, in the sequence parameter set, the second syntax element for the respective dependent layer.

7. An apparatus for decoding video data comprising:
a memory storing video data; and
one or more processors configured to:
  obtain, from a coded bitstream, a syntax element specifying a number of dependent layers associated with a given layer, the dependent layers associated with the given layer being layers available to be used to decode the given layer;
  for each respective dependent layer of the dependent layers associated with the given layer:
    obtain, from the coded bitstream, a first syntax element for the respective dependent layer, the first syntax element for the respective dependent layer specifying a view index of the respective dependent layer; and
    obtain, from the coded bitstream, a second syntax element for the respective dependent layer, distinct from the first syntax element for the respective dependent layer, the second syntax element for the respective dependent layer indicating which one of the following types of prediction is usable with the respective dependent layer:
      (1) texture prediction but not motion prediction,
      (2) motion prediction but not texture prediction, and
      (3) both texture prediction and motion prediction;
  construct a reference picture set (RPS) that includes an inter-view reference picture set, wherein the dependent layers associated with the given layer include a particular dependent layer and, based on the second syntax element for the particular dependent layer indicating that the type of prediction usable with the particular dependent layer is texture prediction, the inter-view reference picture set includes a view component with a view order index equal to a view index of the particular dependent layer; and
  use a reference picture in the RPS for inter prediction of a coded picture of the video data.

8. The apparatus of claim 7, wherein the given layer is one of:
a view;
a texture component of a view;
a depth component of a view;
a spatial scalable layer; and
a quality scalable layer.

9. The apparatus of claim 7, wherein the one or more processors are configured to:
  obtain, from a sequence parameter set of the coded bitstream, the first syntax element for the respective dependent layer, and
  obtain, from the sequence parameter set, the second syntax element for the respective dependent layer.

10. A device that encodes video data, the device comprising:
a memory storing video data; and
one or more processors configured to:
  include, in a coded bitstream, a syntax element specifying a number of dependent layers associated with a given layer, the dependent layers associated with the given layer being layers available to be used to decode the given layer;
  for each respective dependent layer of the dependent layers associated with the given layer:
    include, in the coded bitstream, a first syntax element for the respective dependent layer, the first syntax element for the respective dependent layer specifying a view index of the respective dependent layer; and
    include, in the coded bitstream, a second syntax element for the respective dependent layer, distinct from the first syntax element for the respective dependent layer, the second syntax element for the respective dependent layer indicating which one of the following types of prediction is usable with the respective dependent layer:
      (1) texture prediction but not motion prediction,
      (2) motion prediction but not texture prediction, and
      (3) both texture prediction and motion prediction;
  construct a reference picture set (RPS) that includes an inter-view reference picture set, wherein the dependent layers associated with the given layer include a particular dependent layer and, based on the second syntax element for the particular dependent layer indicating that the type of prediction usable with the particular dependent layer is texture prediction, the inter-view reference picture set includes a view component with a view order index equal to a view index of the particular dependent layer; and
  use a reference picture in the RPS for inter prediction of a coded picture of the video data.

11. The device of claim 10, wherein the given layer is one of:
a view;
a texture component of a view;
a depth component of a view;
a spatial scalable layer; and
a quality scalable layer.

12. The device of claim 10,
wherein the one or more processors are configured such that to include, in the coded bitstream, the first syntax element for the respective dependent layer, the one or more processors include, in a sequence parameter set of the coded bitstream, the first syntax element for the respective dependent layer, and
wherein the one or more processors are configured such that to include, in the coded bitstream, the second syntax element for the respective dependent layer, the one or more processors include, in the sequence parameter set, the second syntax element for the respective dependent layer.

13. A non-transitory computer readable storage medium having stored thereon instructions that, when executed, cause one or more processors of an apparatus for decoding video data to:
  obtain, from a coded bitstream, a syntax element specifying a number of dependent layers associated with a given layer, the dependent layers associated with the given layer being layers available to be used to decode the given layer;
  for each respective dependent layer of the dependent layers associated with the given layer:
    obtain, from the coded bitstream, a first syntax element for the respective dependent layer, the first syntax element for the respective dependent layer specifying a view index of the respective dependent layer; and
    obtain, from the coded bitstream, a second syntax element for the respective dependent layer, distinct from the first syntax element for the respective dependent layer, the second syntax element for the respective dependent layer indicating which one of the following types of prediction is usable with the respective dependent layer:
(1) texture prediction but not motion prediction,
(2) motion prediction but not texture prediction, and
(3) both texture prediction and motion prediction;

construct a reference picture set (RPS) that includes an inter-view reference picture set, wherein the dependent layers associated with the given layer include a particular dependent layer and, based on the second syntax element for the particular dependent layer indicating that the type of prediction usable with the particular dependent layer is texture prediction, the inter-view reference picture set includes a view component with a view order index equal to a view index of the particular dependent layer; and use a reference picture in the RPS for inter prediction of a coded picture of the video data.

14. The non-transitory computer readable storage medium of claim 13, wherein the given layer is one of:
a view;
a texture component of a view;
a depth component of a view;
a spatial scalable layer; and
a quality scalable layer.

15. The non-transitory computer readable storage medium of claim 13, wherein execution of the instructions causes the one or more processors to
obtain, from a sequence parameter set of the coded bitstream, the first syntax element for the respective dependent layer, and
obtain, from the sequence parameter set, the second syntax element for the respective dependent layer.

* * * * *